(12) United States Patent
Hebert et al.

(10) Patent No.: US 10,401,142 B2
(45) Date of Patent: Sep. 3, 2019

(54) 3-D SCANNING AND POSITIONING INTERFACE

(71) Applicant: CREAFORM INC., Lévis (CA)

(72) Inventors: Patrick Hebert, Québec (CA); Alexandre Carette, Québec (CA); Éric Saint-Pierre, Lévis (CA)

(73) Assignee: Creaform Inc., Lévis, Québec (CA)

( * ) Notice: Subject to any disclaimer, the term of this patent is extended or adjusted under 35 U.S.C. 154(b) by 1199 days.

(21) Appl. No.: 14/405,430

(22) PCT Filed: Jun. 26, 2013

(86) PCT No.: PCT/IB2013/055258
§ 371 (c)(1),
(2) Date: Dec. 4, 2014

(87) PCT Pub. No.: WO2014/013363
PCT Pub. Date: Jan. 23, 2014

(65) Prior Publication Data
US 2015/0142378 A1    May 21, 2015

Related U.S. Application Data

(60) Provisional application No. 61/672,858, filed on Jul. 18, 2012.

(51) Int. Cl.
*G06T 7/73* (2017.01)
*G01B 11/00* (2006.01)
(Continued)

(52) U.S. Cl.
CPC ............ *G01B 11/002* (2013.01); *G01B 11/24* (2013.01); *G01B 11/25* (2013.01); *G06T 7/521* (2017.01);
(Continued)

(58) Field of Classification Search
None
See application file for complete search history.

(56) References Cited

U.S. PATENT DOCUMENTS 5,561,526 A     10/1996   Huber et al.
5,966,473 A  *  10/1999   Takahashi ............ G06K 9/2054
                                                             345/441
(Continued)

FOREIGN PATENT DOCUMENTS

CA    2256587 A1   12/1997
CA    2656163 A1    9/2006
(Continued)

OTHER PUBLICATIONS

Newcombe et al., "KinectFusion: Real-Time Dense Surface Mapping and Tracking", 2011 10th IEEE International Symposium on Mixed and Augmented Reality (ISMAR), Oct. 26-29, 2011, pp. 127-136, IEEE, Basel.
(Continued)

*Primary Examiner* — Gregory J Toatley, Jr.
*Assistant Examiner* — Brandon J Becker
(74) *Attorney, Agent, or Firm* — Pearl Cohen Zedek Latzer Baratz LLP

(57) ABSTRACT

A system and a method for providing an indication about positioning unreliability are described. The system comprises a scanner for scanning a surface geometry of an object and accumulating 3D points for each frame using shape-based positioning; a pose estimator for estimating an estimated pose for the scanner using the 3D points; an unreliable pose detector for determining if the estimated pose has an under constrained positioning and an indication generator for generating an indication that the unreliable pose estimation is detected. In one embodiment, a degree of freedom identifier identifies a problematic degree of freedom in the estimated pose. In one embodiment, a feature point detector
(Continued)

detects a reobservable feature point and the pose estimator uses the feature point with the 3D points to estimate the estimated pose and the unreliable pose detector uses the feature point to identify the estimated pose as an unreliable pose estimation.

24 Claims, 16 Drawing Sheets

(51) Int. Cl.
*G01B 11/24* (2006.01)
*G01B 11/25* (2006.01)
*G06T 7/521* (2017.01)

(52) U.S. Cl.
CPC ............ *G06T 7/73* (2017.01); *G01B 2210/52* (2013.01); *G06T 2200/04* (2013.01); *G06T 2207/10028* (2013.01)

(56) References Cited

U.S. PATENT DOCUMENTS

| | | | |
|---|---|---|---|
| 6,137,491 A | 10/2000 | Szeliski | |
| 6,922,632 B2 | 7/2005 | Foxlin | |
| 6,985,238 B2 | 1/2006 | Isaacs et al. | |
| 7,639,741 B1* | 12/2009 | Holt | G06T 5/50 375/240.08 |
| 7,768,656 B2 | 8/2010 | Lapa et al. | |
| 7,912,673 B2 | 3/2011 | Hébert et al. | |
| 8,032,327 B2 | 10/2011 | Hebert et al. | |
| 8,082,120 B2 | 12/2011 | St-Pierre et al. | |
| 8,090,194 B2 | 1/2012 | Golrdon et al. | |
| 8,121,399 B2* | 2/2012 | Hayashi | G01B 11/24 345/419 |
| 8,662,676 B1 | 3/2014 | Chang et al. | |
| 8,791,997 B2 | 7/2014 | Munkelt et al. | |
| 9,325,973 B1 | 4/2016 | Hazeghi et al. | |
| 9,338,447 B1 | 5/2016 | Crump et al. | |
| 2002/0097906 A1* | 7/2002 | Ishiyama | G06K 9/00268 382/154 |
| 2002/0135165 A1* | 9/2002 | Zayan | B60N 2/002 280/735 |
| 2003/0234941 A1 | 12/2003 | Mundy et al. | |
| 2004/0057057 A1 | 3/2004 | Isaacs et al. | |
| 2004/0252230 A1* | 12/2004 | Winder | H04N 5/145 348/402.1 |
| 2006/0062449 A1 | 3/2006 | Pratt | |
| 2006/0104495 A1* | 5/2006 | Cathier | G06T 7/73 382/128 |
| 2007/0103646 A1 | 5/2007 | Young | |
| 2007/0183666 A1* | 8/2007 | Ding | G06K 9/4604 382/199 |
| 2008/0004537 A1* | 1/2008 | Uutela | A61B 5/0428 600/509 |
| 2008/0075324 A1 | 3/2008 | Sato et al. | |
| 2008/0097658 A1* | 4/2008 | Shue | G05D 1/101 701/8 |
| 2008/0201101 A1 | 8/2008 | Hebert et al. | |
| 2008/0285843 A1 | 11/2008 | Lim | |
| 2009/0097039 A1* | 4/2009 | Kawasaki | G01B 11/2509 356/603 |
| 2009/0205088 A1 | 8/2009 | Crampton et al. | |
| 2009/0238449 A1 | 9/2009 | Zhang et al. | |
| 2010/0046801 A1 | 2/2010 | Ishiyama | |
| 2010/0142805 A1* | 6/2010 | Maxwell | G06K 9/346 382/164 |
| 2010/0142818 A1* | 6/2010 | Stein | G06T 5/50 382/173 |
| 2010/0142825 A1* | 6/2010 | Maxwell | G06K 9/0057 382/199 |
| 2010/0142846 A1* | 6/2010 | Tolliver | G06T 7/11 382/274 |
| 2011/0134225 A1 | 6/2011 | Saint-Pierre et al. | |
| 2011/0205338 A1 | 8/2011 | Choi et al. | |
| 2012/0099798 A1 | 4/2012 | Saruta et al. | |

FOREIGN PATENT DOCUMENTS

| | | |
|---|---|---|
| CN | 101026776 A | 8/2007 |
| CN | 101089551 A | 12/2007 |
| CN | 101292131 A | 10/2008 |
| CN | 101611291 A | 12/2009 |
| CN | 102042814 A | 5/2011 |
| CN | 102175182 A | 9/2011 |
| CN | 102263920 A | 11/2011 |
| CN | 102338616 A | 2/2012 |
| CN | 101620676 B | 5/2012 |
| JP | H08136220 A | 5/1996 |
| JP | H1021401 A | 1/1998 |
| JP | 2000175176 A | 6/2000 |
| JP | 2002521683 A | 7/2002 |
| JP | 2009283917 A | 12/2009 |
| JP | 2012026974 A | 2/2012 |
| WO | 99/60525 A1 | 11/1999 |
| WO | 2012168904 A2 | 12/2012 |

OTHER PUBLICATIONS

Choi et al., "Voting-based pose estimation for robotic assembly using a 3D sensor", 2012 IEEE International Conference on Robotics and Automation (ICRA), May 14-18, 2012, pp. 1724-1731, IEEE, Saint Paul, MN.

Guehring, "Reliable 3D surface acquisition, registration and validation using statistical error models", Third International Conference on 3-D Digital Imaging and Modeling, May 28, 2001-Jun. 1, pp. 224-231, IEEE, Quebec City.

Hebert, "A Self-Referenced Hand-Held Range Sensor", Third International Conference on 3 D Digital Imaging and Modeling, May 28-Jun. 1, 2001, pp. 5-12, IEEE, Canada.

Guehring, "Reliable 3D surface acquisition, registration and validation using statistical error models", Third International Conference on 3 D Digital Imaging and Modeling, May 28-Jun. 1, 2001, pp. 224-231, IEEE, Canada.

Blais, "A Review of 20 Years of Range Sensor Development", Journal of Electronic Imaging, Jan. 2004, pp. 231-243, vol. 13 (1), NRC.

Zhang et al., "Rapid Shape Acquisition Using Color Structured Light and Multi-pass Dynamic Programming", pp. 1-13. Available on the internet at http://grail.cs.washington.edu/projects/moscan/paper.pdf on Nov. 23, 2012.

Vuylsteke et al., "Range Image Acquisition with a Single Binary-Encoded Light Pattern", IEEE Transaction on Pattern Analysis and Marchine Intelligence, Feb. 1990, pp. 148-164, vol. 12, No. 2.

Heikkilä, "Geometric camera calibration using circular control points", Pattern Analysis and Machine Intelligence, IEEE Transactions on, Oct. 2000, pp. 1066-1077, vol. 22, No. 10.

Ouellet et al., "Geometric Calibration of a Structured Light System Using Circular Control Points", in Proceedings of the Fourth 3D Data Processing, Visualization and Transmission, Jun. 2008, pp. 1-8, Proceedings of 3DPVT, Atlanta, GA, USA.

Salvi et al,"Pattern Codification Strategies in Structured Light Systems", Pattern Recognition, 2004, pp. 827-849, vol. 37 Elsevier Ltd . . . .

Trucco et al., "Introductory Techniques for 3-D Computer Vision", Chapter 11, 1998, pp. 292-293, Prentice Hall, United States.

Gelfand et al., "Geometrically Stable Sampling for the ICP Algorithm", Fourth International Conference on 3D Digital Imaging and Modeling, Oct. 6-10, 2003, 9 pages, Stanford University, USA.

Gelfand et al., "Shape Segmentation Usign Local Slippage Analysis", Eurographics Symposium on Geometry Processing, 2004, 10 pages, The Eurographics Association 2004, USA.

Hara et al., Method to Determine Likelihood Distribution based on the Shape of Scan Points in Localization with Scan Matching, Proceedings of the 2009 JSME Conference on Robotics and Mechatron-

(56) References Cited

OTHER PUBLICATIONS ics, May 24-26, 2009, 12 pages, The Japan Society of Mechanical Engineers, Japan.

* cited by examiner

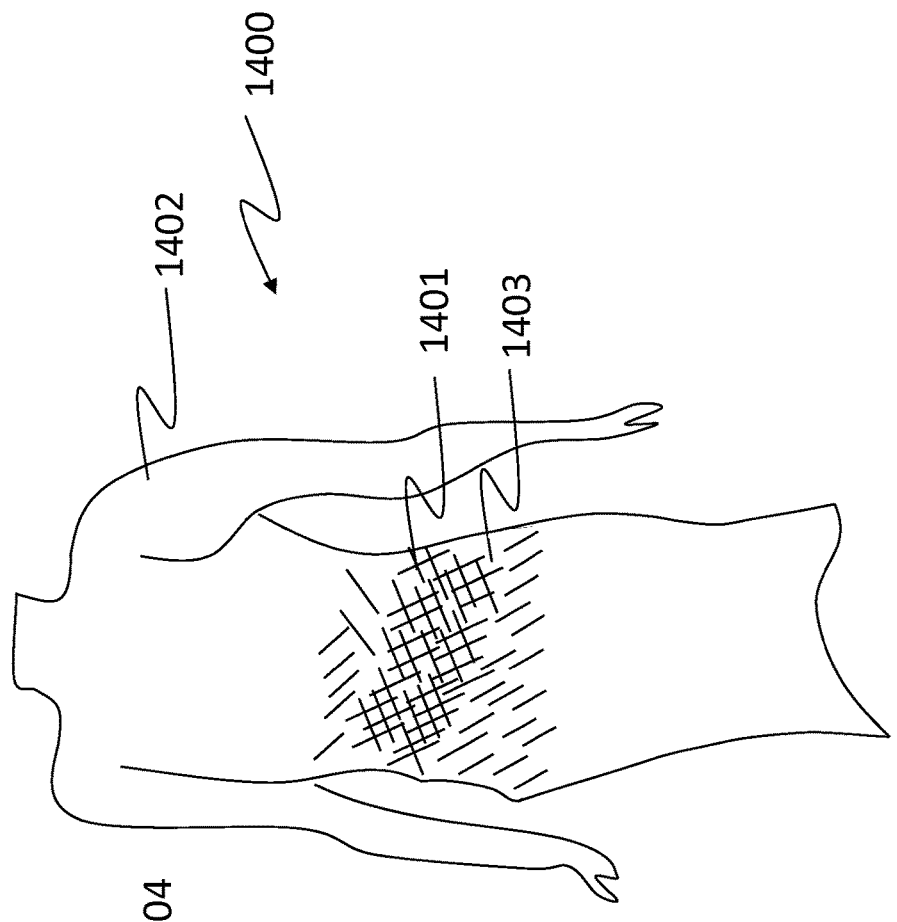
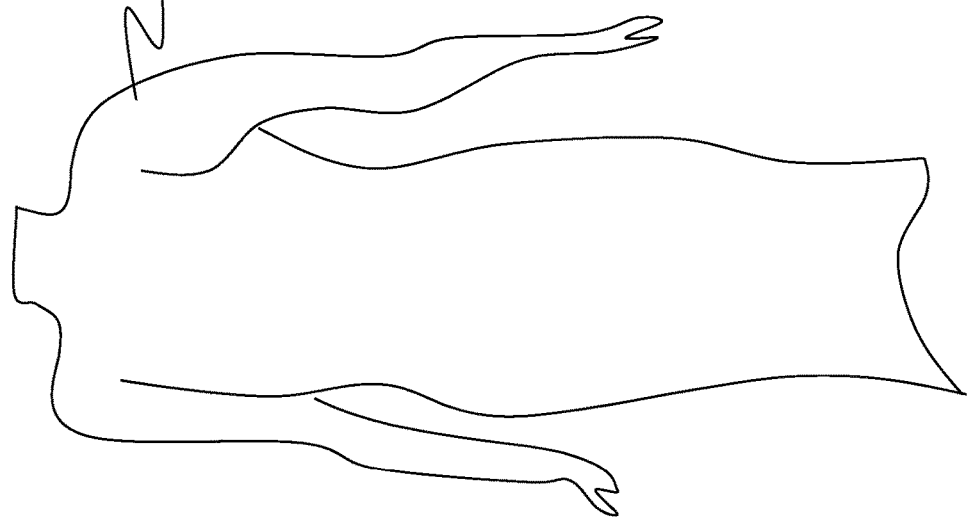
FIG. 14A  FIG. 14B
FIG. 14

3-D SCANNING AND POSITIONING INTERFACE

TECHNICAL FIELD

The present invention generally relates to the field of three-dimensional scanning of the surface geometry of an object, and, more particularly, to structured light stereoscopy.

BACKGROUND OF THE ART

Three-dimensional scanning and digitization of the surface geometry of objects is commonly used in many industries and services, and their applications are numerous. The shape of an object is scanned and digitized using a ranging sensor that measures the distance between the sensor and a set of points on the surface. The sensor captures a section of the object's surface from a given viewpoint. To extend the scanned section or to scan the whole surface, the sensor, or the object, is moved to one of several viewpoints and the spatial relationship between all the relative poses between the sensor and the object is obtained.

Several approaches exist for measuring and calculating these spatial relationships. One of these approaches exploits the shape of the observed object to calculate the relative sensor position and orientation, namely its pose, in space. These shape-based approaches reduce the time to set up the acquisition since there is no need to affix targets or additional references in the scene. An observed shape section may still be insufficiently complex in its shape to ensure that the pose be reliably estimated. There are well known situations such as a planar, spherical, cylindrical surface, and others where it is not possible to unambiguously determine the six degrees of freedom of the sensor pose. In the presence of noise, even non ideal cases may lead to unreliable pose estimation.

SUMMARY

According to one broad aspect of the present invention, there is provided a system for providing an indication about positioning unreliability. The system comprises a scanner for scanning a surface geometry of an object and accumulating a set of 3D points for each frame of a plurality of frames using shape-based positioning for the scanner; a pose estimator for estimating an estimated pose for the scanner using the 3D points; an unreliable pose detector for determining if the estimated pose has an underconstrained positioning and, if the estimated pose has an underconstrained positioning, identifying the estimated pose as an unreliable pose estimation; an indication generator for generating an indication that the unreliable pose estimation is detected.

In one embodiment, the system further comprises a degree of freedom identifier for identifying at least one problematic degree of freedom in the estimated pose, the degree of freedom identifier being triggered by the unreliable pose detector and wherein the indication generated by the indication generator includes information about at least one problematic degree of freedom with the indication.

In one embodiment, the indication generated by the indication generator includes information about all of the problematic degrees of freedom.

In one embodiment, the system further comprises a feature point detector for detecting a presence of a feature point reobservable by the scanner in at least two of the plurality of frames, wherein the pose estimator uses the feature point with the 3D points to estimate the estimated pose and wherein the unreliable pose detector uses the feature point to identify the estimated pose as an unreliable pose estimation.

In one embodiment, the system further comprises a speaker, wherein the indication generator causes the speaker to emit an audible indication.

In one embodiment, the system further comprises a visual interface, wherein the indication generator causes the visual interface to display a visual indication, wherein the visual indication is at least one of a text message and a graphical message.

In one embodiment, the system further comprises a model builder, the model builder building a cumulative model of the geometry of the surface using the sets of 3D points, wherein the visual interface displays a graphical representation of the cumulative model and wherein the visual indication is superimposed on the graphical representation of the cumulative model.

In one embodiment, the system further comprises a voxel sensitivity level calculator for accumulating an average for a voxel sensitivity level in all voxels of the cumulative model modified by the set of 3D points, wherein the visual interface displays the graphical representation of the cumulative model with a color corresponding to the voxel sensitivity level.

In one embodiment, the system further comprises a frame selector for determining a level of unreliability of the unreliable pose estimation; comparing the level of unreliability with a pre-determined unreliability threshold; transferring the set of 3D points of each frame to the model builder only if the level of unreliability is lower than the pre-determined unreliability threshold.

In one embodiment, the visual interface displays a graphical representation of a current frame of the scanning and wherein the visual indication is superimposed on the graphical representation of the current frame.

In one embodiment, the system further comprises a pose sensitivity level attributor for attributing a pose sensitivity level to the estimated pose using the estimated pose, the pose sensitivity level attributor being triggered by the unreliable pose detector and wherein the indication generated by the indication generator includes information about the pose sensitivity level with the indication, wherein the information about the pose sensitivity level is a color of the visual indication.

In one embodiment, the system further comprises a degree of freedom identifier for identifying at least one problematic degree of freedom in the estimated pose, the unreliability degree of freedom identifier being triggered by the unreliable pose detector and wherein the indication generated by the indication generator includes information about at least one problematic degree of freedom with the indication, wherein the graphical message includes at least one arrow, the arrow being displayed with an orientation corresponding to the problematic degree of freedom.

In one embodiment, the system further comprises a user command interface, the user command interface receiving a command from a user to perform a positioning reliability verification, wherein the unreliable pose detector and the indication generator are triggered by the command to generate the indication that the unreliable pose estimation is detected.

According to another broad aspect of the present invention, there is provided a method for providing an indication about positioning unreliability. The method comprises scanning a surface geometry of an object and accumulating a set of 3D points for each frame of a plurality of frames using shape-based positioning; estimating an estimated pose for the scanner using the 3D points; determining if the estimated pose has an underconstrained positioning and, if the estimated pose has an underconstrained positioning, identifying the estimated pose as an unreliable pose estimation; generating an indication that the unreliable pose estimation is detected.

In one embodiment, determining if the estimated pose has the underconstrained positioning includes determining a surface geometry type by using a covariance matrix which describes a quality of a fit of a frame as a function of a variation of the estimated pose; extracting eigenvectors of the covariance matrix; calculating a ratio of corresponding eigenvalues of the eigenvectors; identifying at least one high ratio of the ratios using a predetermined threshold; extracting at least one problematic eigenvector from the high ratio; if there is a single high ratio, determining the surface geometry type to correspond to one of a linear extrusion, a surface of revolution and a helix; if there are two high ratios, confirming the surface geometry type to correspond to a cylinder; if there are three high ratios, determining the surface geometry type to correspond to one of a plane and a sphere.

In one embodiment, the system further comprises a temporal filter, said temporal filter triggering said indication generator to generate said indication when a number u of frames having an unreliable pose estimation in the n latest frames of said plurality of frames reaches a predetermined threshold.

According to another broad aspect of the present invention, there is provided a system and a method for providing an indication about positioning unreliability. The system comprises a scanner for scanning a surface geometry of an object and accumulating a set of 3D points for each frame using shape-based positioning; a pose estimator for estimating an estimated pose for the scanner using the 3D points; an unreliable pose detector for determining if the estimated pose has an underconstrained positioning and an indication generator for generating an indication that the unreliable pose estimation is detected. In one embodiment, a degree of freedom identifier identifies a problematic degree of freedom in the estimated pose. In one embodiment, a feature point detector detects a reobservable feature point and the pose estimator uses the feature point with the 3D points to estimate the estimated pose and the unreliable pose detector uses the feature point to identify the estimated pose as an unreliable pose estimation.

BRIEF DESCRIPTION OF THE DRAWINGS

The accompanying drawings, which are included to provide a better understanding of the main aspects of the invention and are incorporated in and constitute a part of this specification, illustrate example embodiments of the invention and together with the description serve to explain the principles of the invention. The accompanying drawings are not intended to be drawn to scale. In the drawings:

FIG. 14 illustrates a potential consequence of inadequate sensor positioning;

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
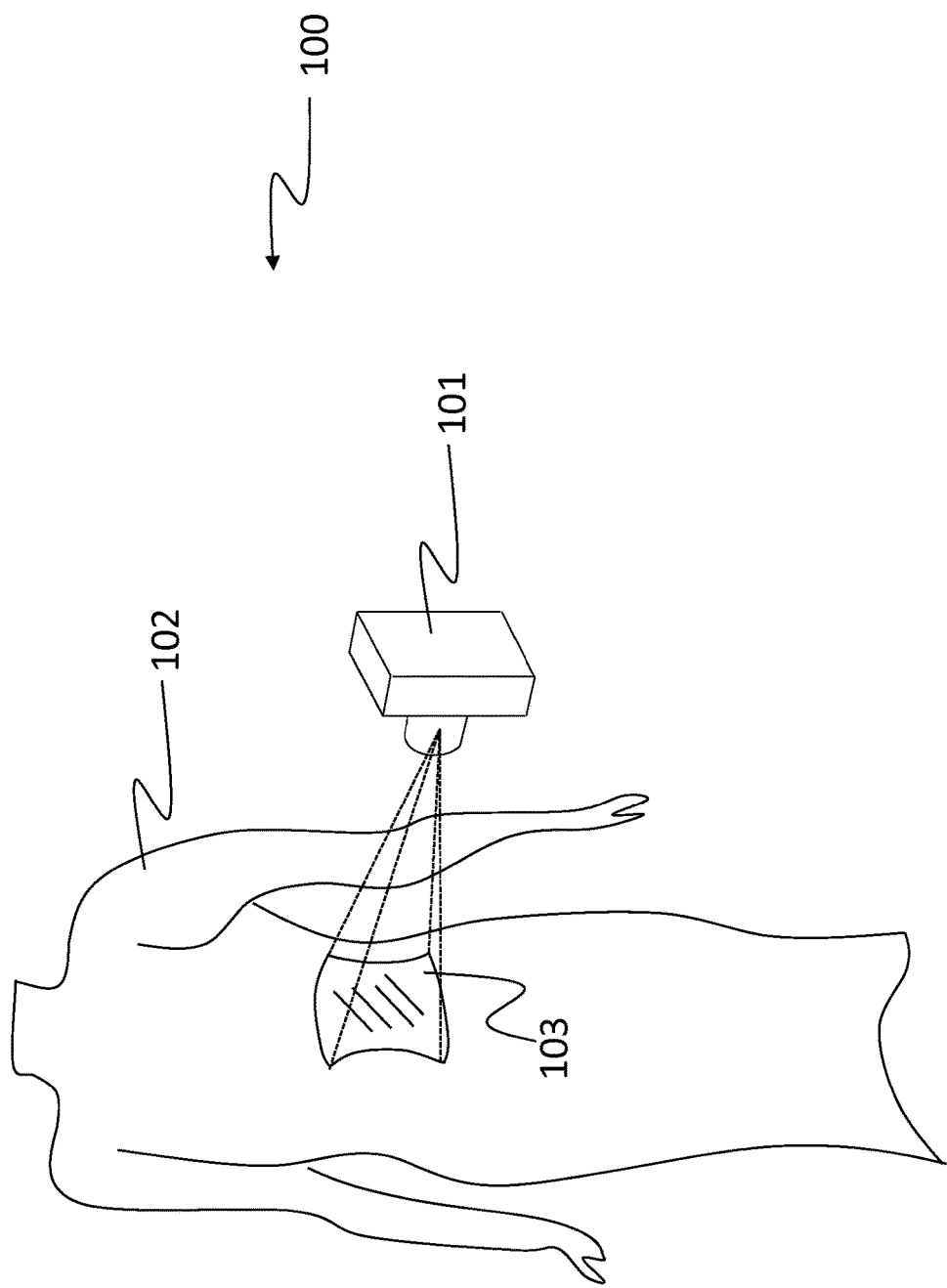
FIG. 1 (prior art) is an illustration of the scanning process of an object.

FIG. 1 (prior art) shows an object 102 whose surface is measured 100 using a range sensor 101. The sensor captures a set of 3D points within a field of view 103, in its own coordinate system. Then the relative position and orientation of the sensor, with respect to the object, is slightly changed. The sensor observes a new section of the object while ensuring an overlap with the surface section already captured. The cumulative observed section is therefore extended in each new frame. Assuming that the object's surface shape remains rigid, the current 3D frame can be fitted with the already observed section to obtain the rigid-body transformation of the sensor with respect to the previous frame's coordinate system or with respect to the coordinate system of an accumulated surface model. Well-known methods exist for that purpose. For instance, let P and Q be two meshes or point sets with associated normals. The rigid-body transformation composed of a 3×3 rotation matrix R and a 3×1 translation vector t, that minimizes the sum of squared distances of each point $p_i$ to the plan tangent to Q at $q_i$, is sought:

$$E = \sum_{i=1}^{k} ((Rp_i + t - q_i) \cdot n_i)^2 \tag{1}$$

If the rotation that minimizes the alignment error E is small, the matrix R and vector t can be solved for after linearizing R.

Figure 2:
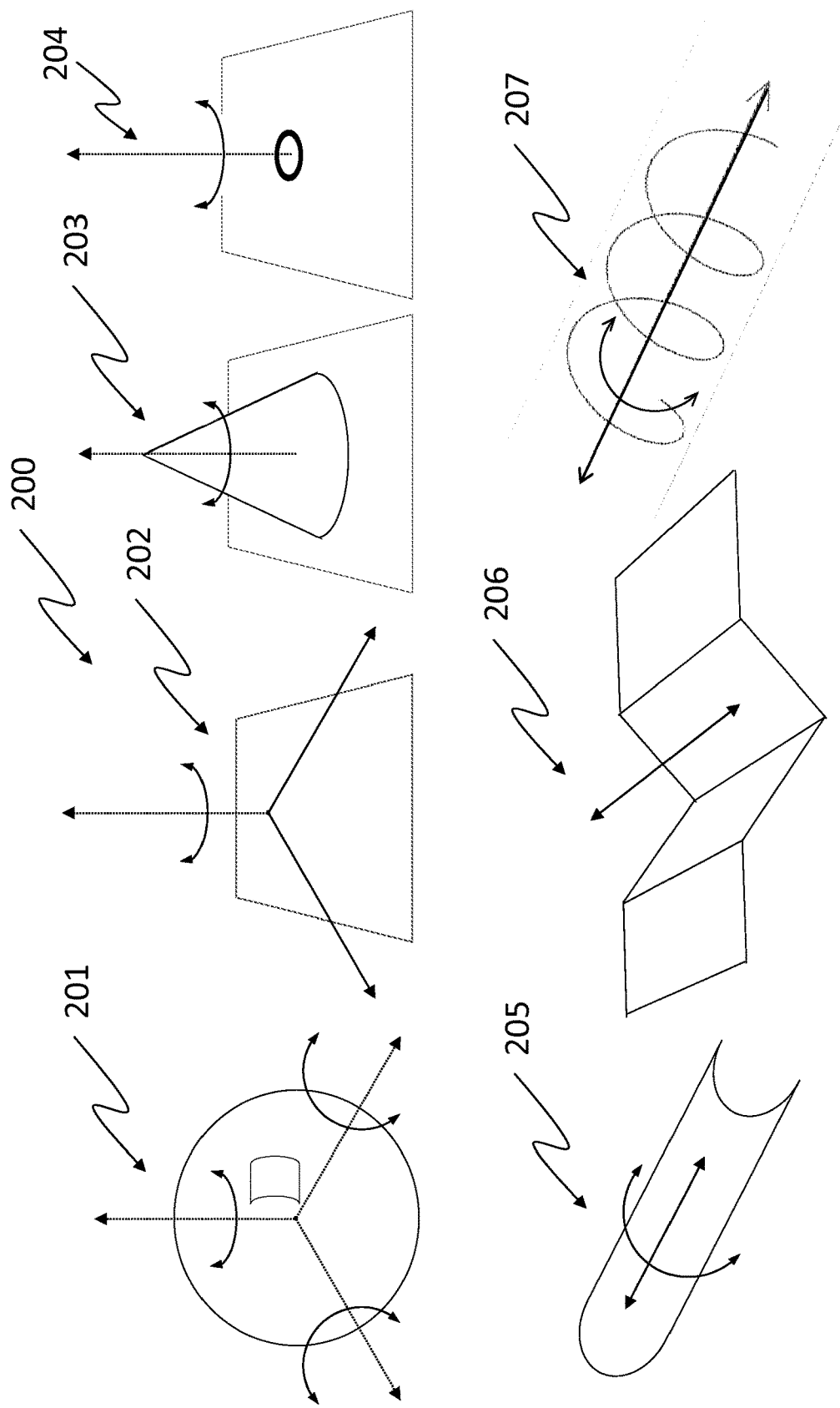
FIG. 2 shows ideal surface cases which can cause uncertainty in the pose in shape-based positioning.

FIG. 2 illustrates situations 200 where the shape-based positioning approach described above, becomes unreliable. Table 1 gives the unconstrained parameters for each surface type shown in FIG. 2.

TABLE 1

Unconstrained parameters for each surface type of FIG. 2.

| Surface type | Reference in FIG. 2 | Unconstrained parameters |
|---|---|---|
| Sphere | 201 | 3 rotations |
| Plane | 202 | 2 translations |
| | | 1 rotation |
| Surface of revolution | 203, 204 | 1 rotation |
| Cylinder | 205 | 1 translation |
| | | 1 rotation |
| Linear extrusion | 206 | 1 translation |
| Helix | 207 | 1 translation |
| | | 1 rotation |

While observing a surface section that is close to a spherical section 201, it is not possible to determine the relative orientation of the sensor. There is no unique solution. The three orientation degrees of freedom are underconstrained. When a nearly planar surface section 202 is observed, the two translations within the plane cannot be determined uniquely. Moreover, the rotation angle around the normal vector of the plane cannot be determined either. The observation of a section from a surface of revolution 203, 204 will lead to an unconstrained orientation angle. A planar section on which is affixed a target also enters this category. For a cylindrical section 205, one translation along the axis as well as the rotation angle around the cylinder axis is underconstrained. For a linear extrusion 206, one translation direction is underconstrained. For a helical motion 207, a rotation angle and the translation along an axis are underconstrained. These cases are generic cases.

Some of these cases can be further generalized. For example, the observation of a set of planes with the same normal vector is equivalent to the plane surface type 202. Observing concentric spheres or cylindrical sections corresponds to the situation where a sphere 201 or a cylinder surface type 205 is observed. The same holds true for sections of concentric surfaces of revolution or parallel linear extrusions.

When one of these situations 200 occurs, the positioning system should exploit other characteristics to ensure positioning reliability. Positioning reliability is a necessary condition to integrate large surface sections of an object within a complete surface model. One can exploit texture information or affix targets on the object. The role of texture is similar to the role of targets. Feature points in the texture can be detected and matched between frames or between the current frame and a reference model including these feature points. Targets offer the advantage of being extracted with good precision, thus ensuring reliable sensor positioning.

Detecting these situations of underconstrained positioning and preventing errors while accumulating frames is a challenge. When such a situation is detected, the system of the present invention can inform the user about the degrees of freedom that are unreliable. This can be done in real-time. It is then possible to add targets to the surface where necessary. It is also possible to provide a diagnosis for the whole modeled surface and indicate where the positioning is reliable and where it is less reliable or unreliable.

Gelfand et al. (in "Geometrically Stable Sampling for the ICP Algorithm", Proc. International Conference on 3D Digital Imaging and Modeling, 2003, pp. 260-267 and "Shape Segmentation Using Local Slippage Analysis", ACM Symposium on Geometry Processing, 2004, pp. 219-228) have proposed a mathematical tool to identify the weaker degrees of freedom from sets of 3D surface points. They rewrite Equation 1 as a function of a transformation vector (r,t) where r is a rotation vector around the three canonical axes x, y and z and t is the translation vector in 3D space. This makes it possible to obtain the expression of a covariance matrix C that characterizes how much the energy E in Equation 1 (the alignment error) will change after a small displacement of P from its optimum alignment with Q, by the vector $[\Delta r^T \, \Delta t^T]$:

$$C = \begin{bmatrix} p_1 \times n_1 & \cdots & p_k \times n_k \\ n_1 & \cdots & n_k \end{bmatrix} \begin{bmatrix} (p_1 \times n_1)^T & n_1 \\ \cdots & \cdots \\ (p_k \times n_k)^T & n_k \end{bmatrix} \quad (2)$$

In this expression, $p_i$ is a point in Q and $n_i$ is the surface normal at the corresponding matched point in Q. The expected variation of energy after a displacement by $[\Delta r^T \, \Delta t^T]$ is:

$$\Delta E = [\Delta r^T \, \Delta t^T] \, C \begin{bmatrix} \Delta r \\ \Delta t \end{bmatrix} \quad (3)$$

The transformations for which this increase is relatively small will correspond to directions where the input sets can slide relative to each other and thus underconstrain the transformation. In order to identify these directions, one will extract the eigenvectors of matrix C and calculate the ratio of the corresponding eigenvalues. Assuming the eigenvalues are in decreasing order from $\lambda_1$ to $\lambda_6$ the following ratios are calculated:

$$\frac{\lambda_1}{\lambda_2}, \frac{\lambda_1}{\lambda_3}, \frac{\lambda_1}{\lambda_4}, \frac{\lambda_1}{\lambda_5}, \frac{\lambda_1}{\lambda_6}.$$

The last ratio $$\frac{\lambda_1}{\lambda_6}$$

is the condition number of the covariance matrix. To obtain good estimates from the covariance matrix, Equation 2 is computed after normalizing the points. That means, the points are priorly centered with respect to their average and the transformed coordinates are scaled such that the average distance to the origin is 1.

With the system of the present invention, when a feature point such as a target is also observed, the covariance matrix is calculated as follows:

$$C_{tot} = C + \alpha C_f \text{ with } \alpha \geq 0, \quad (4)$$

Where $C_f$ is calculated similarly to C after using the position of the feature point for $p_i$ and using the normal vector to each of the three canonical planes (x=0; y=0; z=0) thus $[1 \, 0 \, 0]^T$, $[0 \, 1 \, 0]^T$, $[0 \, 0 \, 1]^T$ for the three normal vectors $n_{i1}$, $n_{i2}$, $n_{i3}$ respectively. Considering there are k surface points that contribute to the calculation of C and m-k feature points, the expression for $C_f$ is:

$$C_f = \begin{bmatrix} p_{k+1} \times n_{k+11} & p_{k+1} \times n_{k+12} & p_{k+1} \times n_{k+13} & \cdots & p_{k+m} \times n_{k+m3} \\ n_{k+11} & n_{k+12} & n_{k+13} & \cdots & n_{k+m3} \end{bmatrix} \quad (5)$$

$$\begin{bmatrix} (p_{k+1} \times n_{k+11})^T & n_{k+11} \\ (p_{k+1} \times n_{k+12})^T & n_{k+12} \\ (p_{k+1} \times n_{k+13})^T & n_{k+13} \\ \cdots & \cdots \\ (p_{k+m} \times n_{k+m3})^T & n_{k+m3} \end{bmatrix}$$

The value for α can be optimized according to a criterion. One example is a value that minimizes the condition number $\lambda_1/\lambda_6$ from the eigenvalues of $C_{tot}$.

In order to identify the least reliable degrees of freedom, the ratio of the largest eigenvalue to each of the other eigenvalues is considered. Interestingly, it is apparent from FIG. 2 and Table 1 that the observation of a real surface will constrain at least three out of six degrees of freedom. Once the eigenvalues are sorted in descending order, one simple way to identify the subset of less reliable degrees of freedom thus consists in identifying from the third eigenvalue where there is an important step in the ordered ratios. A factor of 10 may discriminate between the two subsets. It is also verified that the condition number is higher than a threshold. For example, this threshold can exceed 100. It is clear that other values or criteria on the eigenvalues can be applied. The corresponding eigenvectors that represent less reliable motion are then obtained. It is worth noting that eigenvectors that are not perfectly aligned with the canonical axes [$r_x$ $r_y$ $r_z$ $t_x$ $t_y$ $t_z$], where $r_x$, $r_y$ and $r_z$ are the rotation components and $t_x$, $t_y$ and $t_z$ are the translation components, represent non generated helix motions composed of a uniform rotation superimposed with a uniform translation. If one target has been detected, then no more than one eigenvector can be tagged with a high condition number since the combination of 3D points on a surface section with the fixed feature point constrains to one rotation degree of freedom. When more than one target is observed along with surface points, no eigenvector can be tagged. The observation constrains the pose well according to the local energy criterion in Equation 3.

Nevertheless, symmetry is possible and could be identified and/or analyzed when one does not assume small motion, fine registration, between views. For example, PCT patent application publication no. WO 2012/168,904 discusses methods and systems to detect a possible symmetry.

Once the eigenvectors corresponding to the least reliable degrees of freedom have been identified, the components of these eigenvectors are analyzed. Each eigenvector is a 6 component vector in the basis [$r_x$ $r_y$ $r_z$ $t_x$ $t_y$ $t_z$]. We can simply write it as [r t]. Since each vector represents a helix, the pitch of the helix will help identify the type of motion. The expression for the pitch is:

$$\tau = \frac{r.t}{r.r} \quad (6)$$

While a pitch of 0 will be associated with a uniform rotation, a very large (infinite) pitch will approach a translation. If only one eigenvector is identified when searching for the less reliable degrees of freedom, the pitch is calculated and it is determined whether a rotation, a translation or a helix motion can be assigned. If it is a rotation then the observed surface corresponds to the case of a surface of revolution 203, 204. If it is a translation then the observed surface section behaves as a linear extrusion 206. Otherwise, it is a helix 207.

When two eigenvectors are identified we have to confirm that the corresponding case is a cylinder 205. While one eigenvector will describe a rotation with a low pitch, the second eigenvector will represent the translation, high pitch value, along the axis of the cylinder. They are also identified using the pitch. Finally, there is the case when three eigenvectors are identified. This case may correspond to a sphere 201 or a plane 202. Calculating a low value for the pitch will indicate three rotations in the case of the sphere 201, one for each eigenvector. The rotation vectors $r_1$, $r_2$, $r_3$ associated with each eigenvector, should be nearly orthogonal. In the presence of a planar section 202, one rotation and two translations are identified, each belonging to a different eigenvector. A method for detecting the presence of planes with the same normal consists in calculating the dot products $r_i \cdot r_j$ ($i \neq j$). These rotation components are all nearly parallel for a plane. The absolute value will be typically higher than 0.9.

An alternate approach to discriminate between a plane 202 and a sphere 201 consists in fitting a plane on the observed 3D points of the current frame. That can be accomplished by extracting the eigenvalues of the covariance matrix of the 3D points after subtracting their average. The smallest eigenvalue corresponds to the eigenvector that is normal to the plane. It is then possible to apply a threshold on the ratio of the second largest eigenvalue to the smallest eigenvalue and make a decision between a plane 202 and a sphere 201. Nevertheless, the first approach yields better results since it will detect parallel planes. As mentioned above, the observation of parallel planes leads to the same unreliable degrees of freedom. The position can slide in translation and rotate around the common normal vector of the planes. At this point one will have determined the surface type that is observed.

Figure 9A:
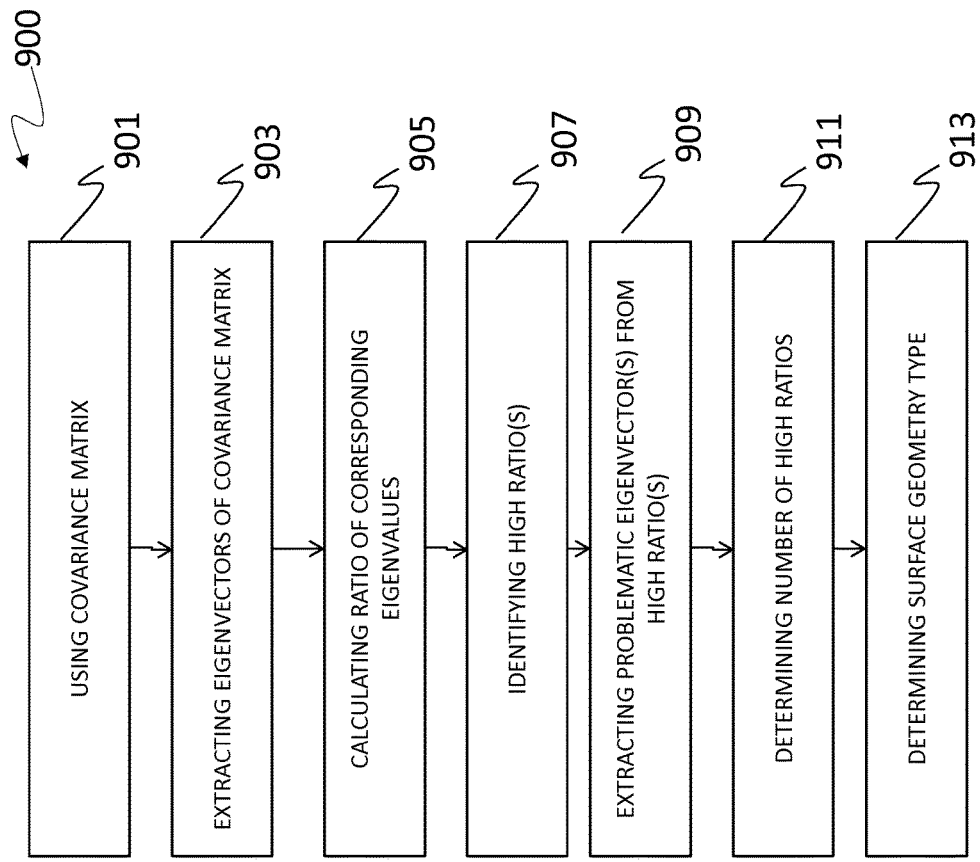
FIG. 9 includes FIG. 9A and FIG. 9B which are flow charts of example steps for, in FIG. 9A, the method for determining a surface geometry type and, in FIG. 9B, the method for identifying cases of surface slippage.

The whole procedure 900 is summarized in FIG. 9. In FIG. 9A, example steps for the method for determining a surface geometry type include using a covariance matrix which describes a quality of a fit of a frame as a function of a variation of the estimated pose 901, extracting eigenvectors of the covariance matrix 903, calculating a ratio of corresponding eigenvalues of the eigenvectors 905, identifying at least one high ratio of the ratios using a predetermined threshold 907, extracting at least one problematic eigenvector from the high ratio 909, determining a number of high ratios 911 and determining a surface geometry type using the number of high ratios 913. If there is a single high ratio, the surface geometry type is determined to correspond to one of a linear extrusion, a surface of revolution and a helix. If there are two high ratios, the surface geometry type is confirmed to correspond to a cylinder. If there are three high ratios, the surface geometry type is determined to correspond to one of a plane and a sphere.

Figure 9B:
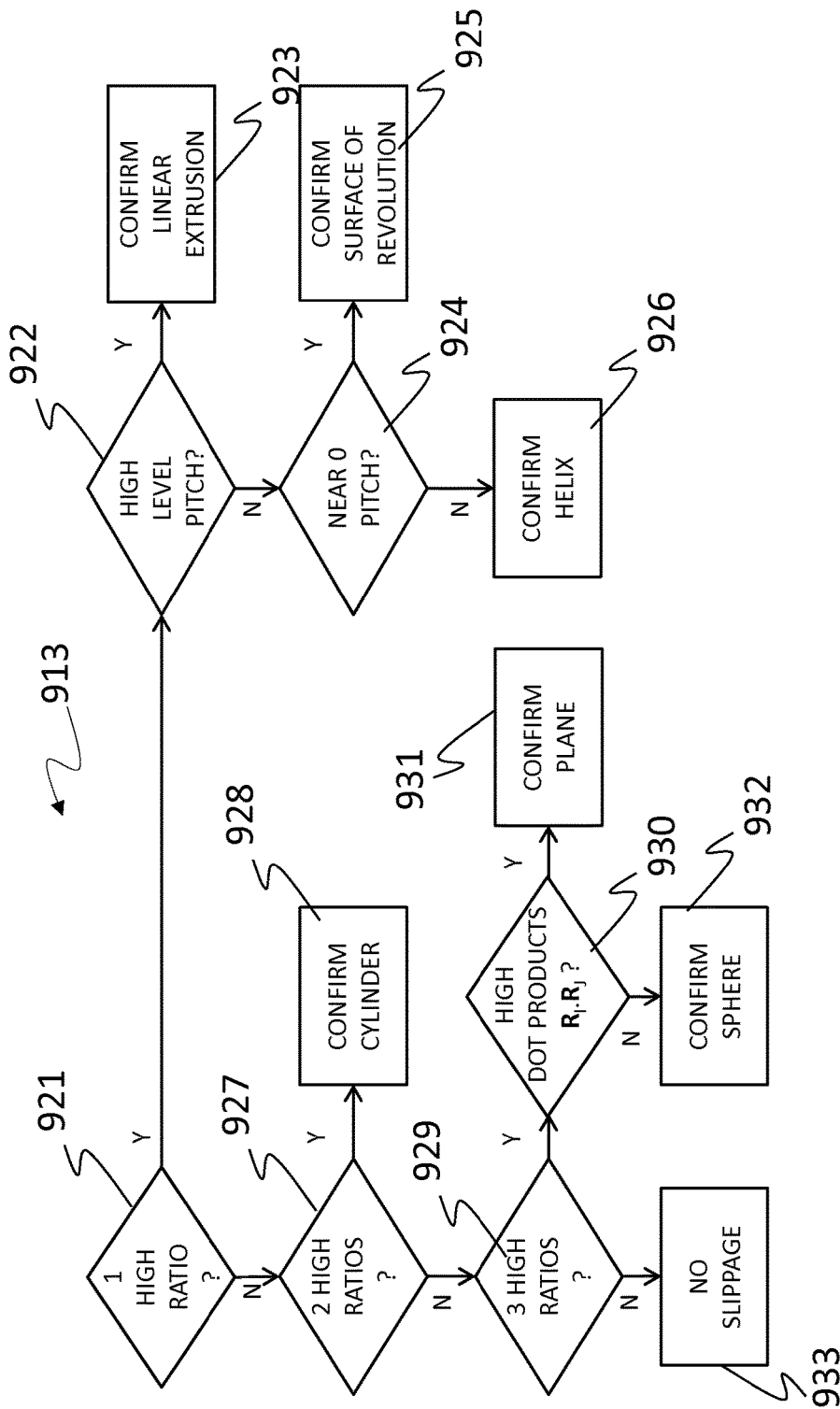

FIG. 9B details example sub-steps for the step of determining a surface geometry type using the number of high ratios 913.

It is tested 921 whether there is only one eigenvector that represents a potential slippage or not. If the test is positive then the pitch of the identified eigenvector is calculated and tested 922 for its value. If the pitch has a high level (for example >1), then we confirm 923 the type of surface corresponds to a linear extrusion. When the test 922 fails, it is tested whether the pitch value is near 0 or not (for example <0.1) 924. If the pitch is near 0, we can confirm 925 the surface type is a surface of revolution, otherwise we confirm 926 it is a helix.

If there is more than one eigenvalue presenting a high ratio when compared with the highest eigenvalue of the covariance matrix, it is tested 927 if there are two such eigenvalues. If the test is positive we confirm 928 it is a cylinder surface.

Otherwise, it is verified 929 if three eigenvalues present a high ratio. If the test is positive, the three dot products $r_i \cdot r_j$ ($i \neq j$) are tested 930. If all of them are high (for example >0.9), we confirm 931 it is a plane surface type. Otherwise, we confirm 932 we are in presence of a spherical surface type.

Since there cannot be more than three eigenvalues with a high ratio with respect to the highest eigenvalue, the surface is otherwise determined 933 to have no slippage.

In order to assist the user, a visual indication can be provided. This visual indication can be specific to the identified case. It can be superimposed on the display of the current frame already available to the user. Alternatively, an audible indication can be used.

Figure 3:
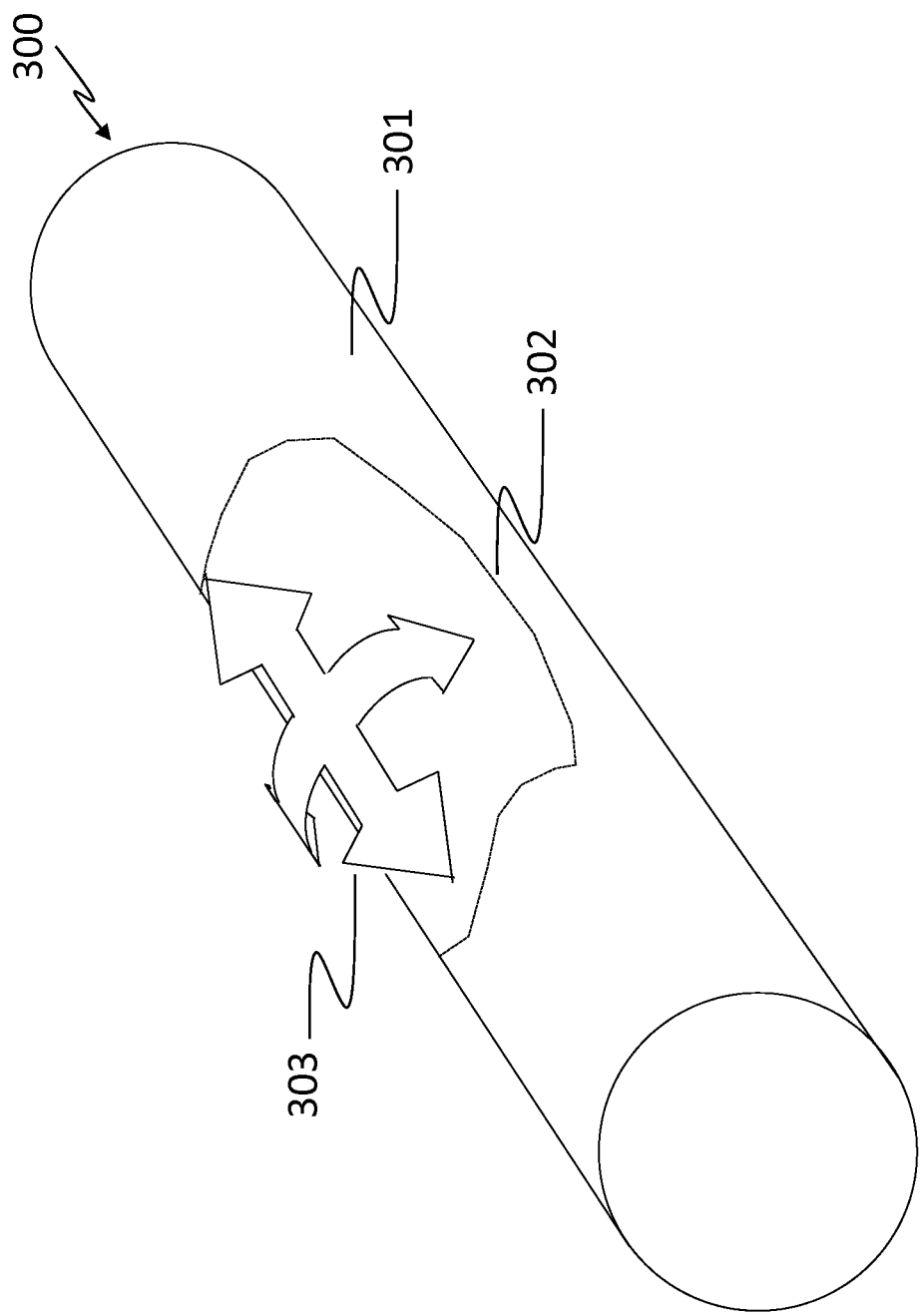
FIG. 3 illustrates visual feedback of unconstrained degrees of freedom on a cylindrical object section.

Examples of visual superimpositions in the user interface are illustrated in FIG. 3 to FIG. 7. In FIG. 3, the display 300 of a cylinder is illustrated. The current frame 302 is superimposed on the object 301. Typically, the whole object will only be displayed after it has been fully captured and modeled. The current frame will therefore appear superimposed on a partially modeled object. Arrows 303 are displayed above the current frame. When this symbol 303 is displayed, it indicates that a translation motion along the axis of the cylinder and a rotation around the same axis are potentially less reliable. The arrow that indicates the rotation can be curved according to the curvature of the cylinder 301.

This indication 303 indicates that the user should better constrain the motion in order to avoid an accumulation of error during displacement of the sensor. One way of constraining the motion is to apply targets on or besides the object 301.

Figure 4:
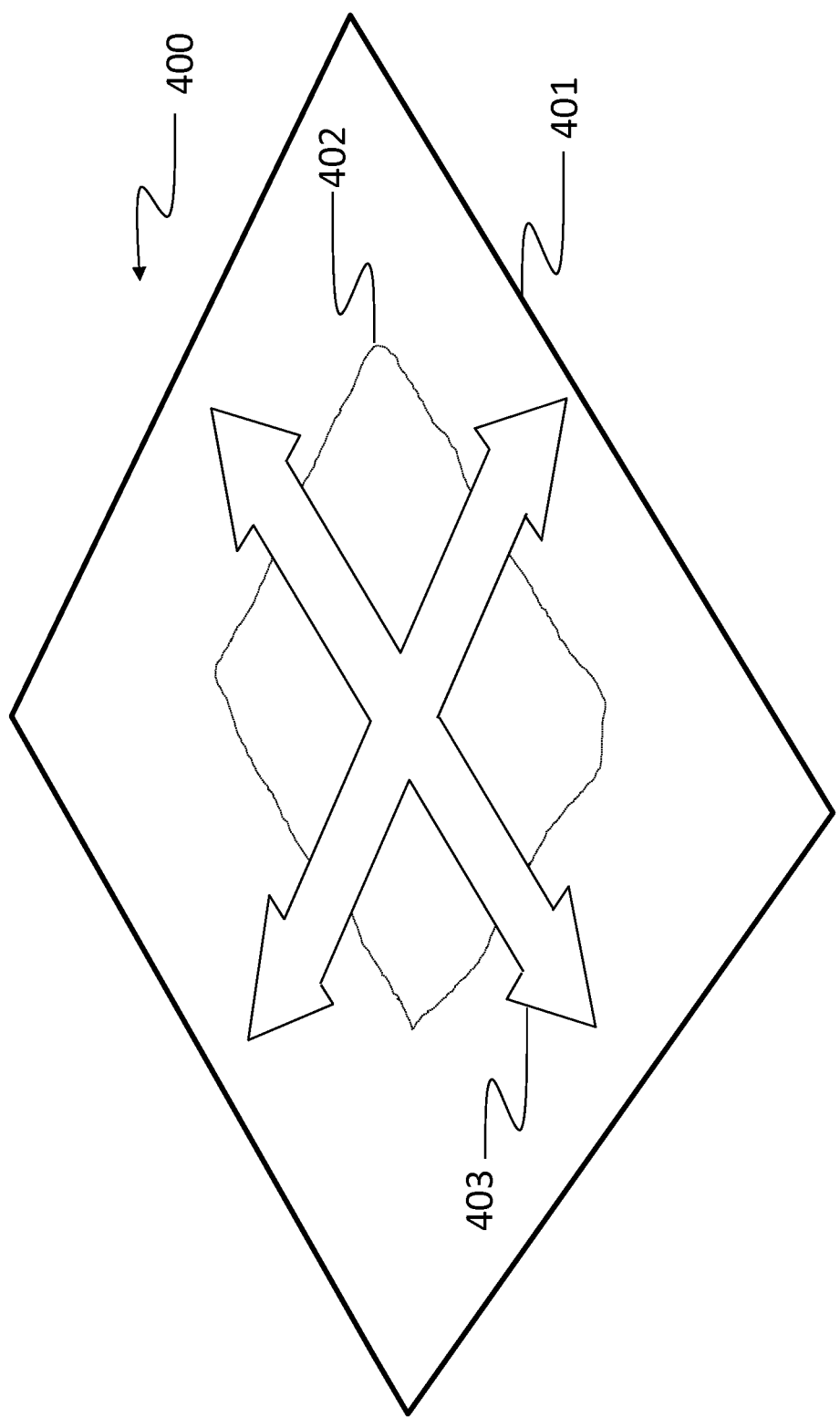
FIG. 4 illustrates visual feedback of unconstrained degrees of freedom on a planar object section.

FIG. 4 shows the display 400 of a planar section 401. The current frame 402 is shown superimposed on the plane 401. Again, only the partially accumulated model of the plane will typically be visible during the scanning process. Although it is possible to display both translations and the normal axis to inform the user about the possible loss of accuracy, one can simplify the display and only depict the translational degrees of freedom 403. The user understands with a simplified graphical message 403 that some features are missing to help positioning. The pictogram 403 is superimposed on the current frame display 402.

Figure 5:
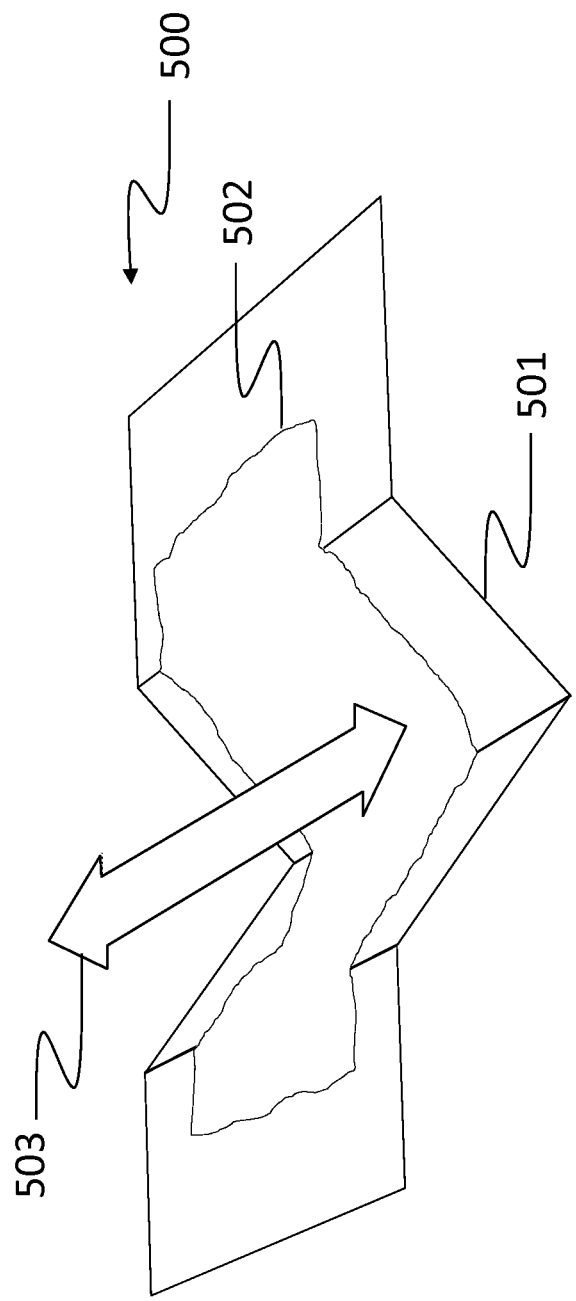
FIG. 5 illustrates visual feedback of an unconstrained degree of freedom on a linearly extruded object section.

FIG. 5 shows the display 500 with a linear extrusion surface type 501. The modeled object 501 is shown along with the current frame 502. In this case, the system has detected the surface type and lack of reliability in positioning along the depicted arrow 503.

Figure 6:
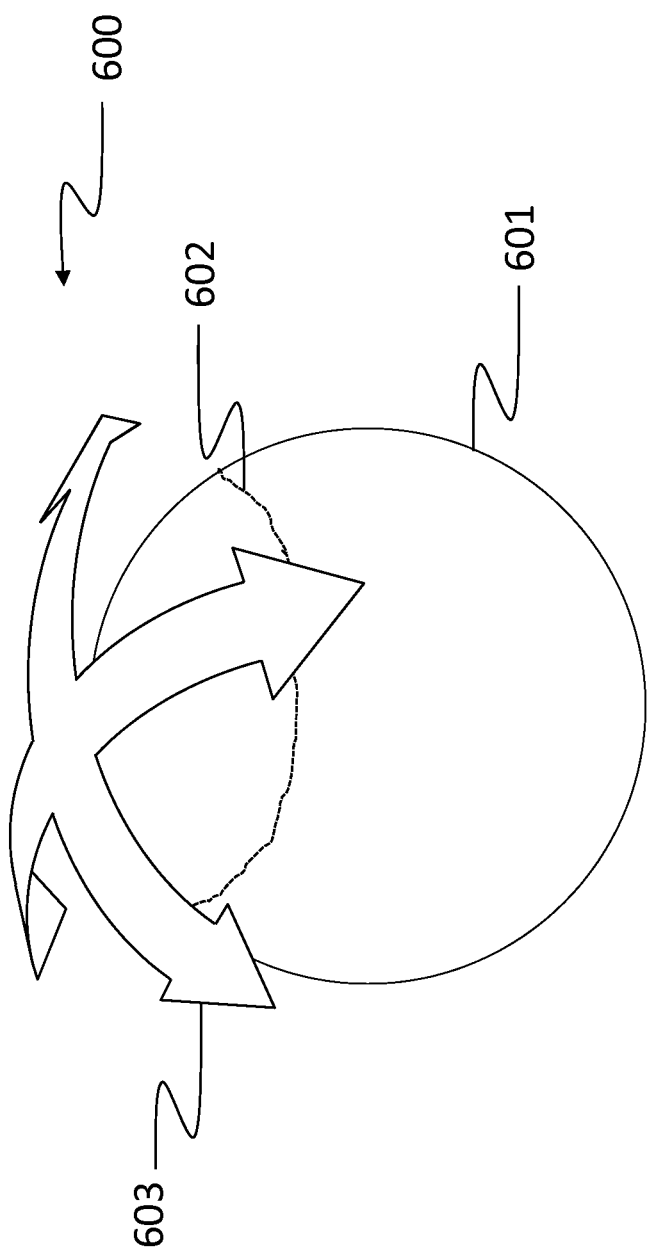
FIG. 6 illustrates visual feedback of unconstrained degrees of freedom on a spherical object section.

FIG. 6 shows the display 600 of a sphere 601. The object 601 along with the current frame 602 are shown. A simplified representation 603 of the least reliable degrees of freedom is shown. In this example case, the roll (angular rotation around the normal to the sphere) is not displayed. It could be displayed when deemed useful.

Figure 7:
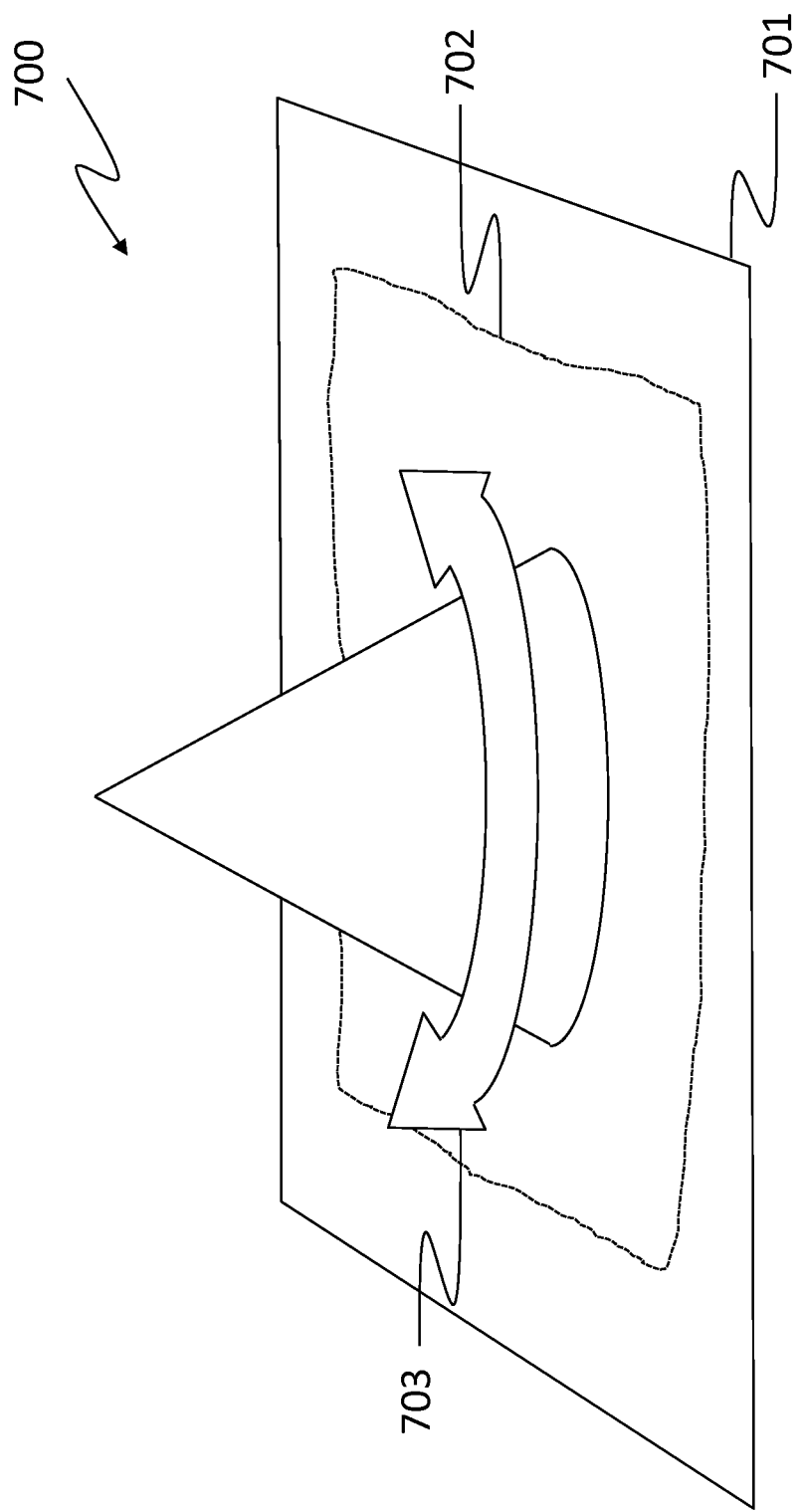
FIG. 7 illustrates visual feedback of an unconstrained degree of freedom for a rotation symmetric object section.

FIG. 7 shows the display 700 of a surface of revolution 701. The object 701 is shown with the current frame 702 superimposed and the arrow 703 shows the rotation, and implicitly its axis, since it is less reliable for positioning.

The display of the helix 207 is not shown. In a simplified version, the user would see a visual feedback that is similar to the one of a cylinder (see FIG. 3) since both the rotation around an axis and a translation along this same axis are the least reliable degrees of freedom in that case.

Figure 10:
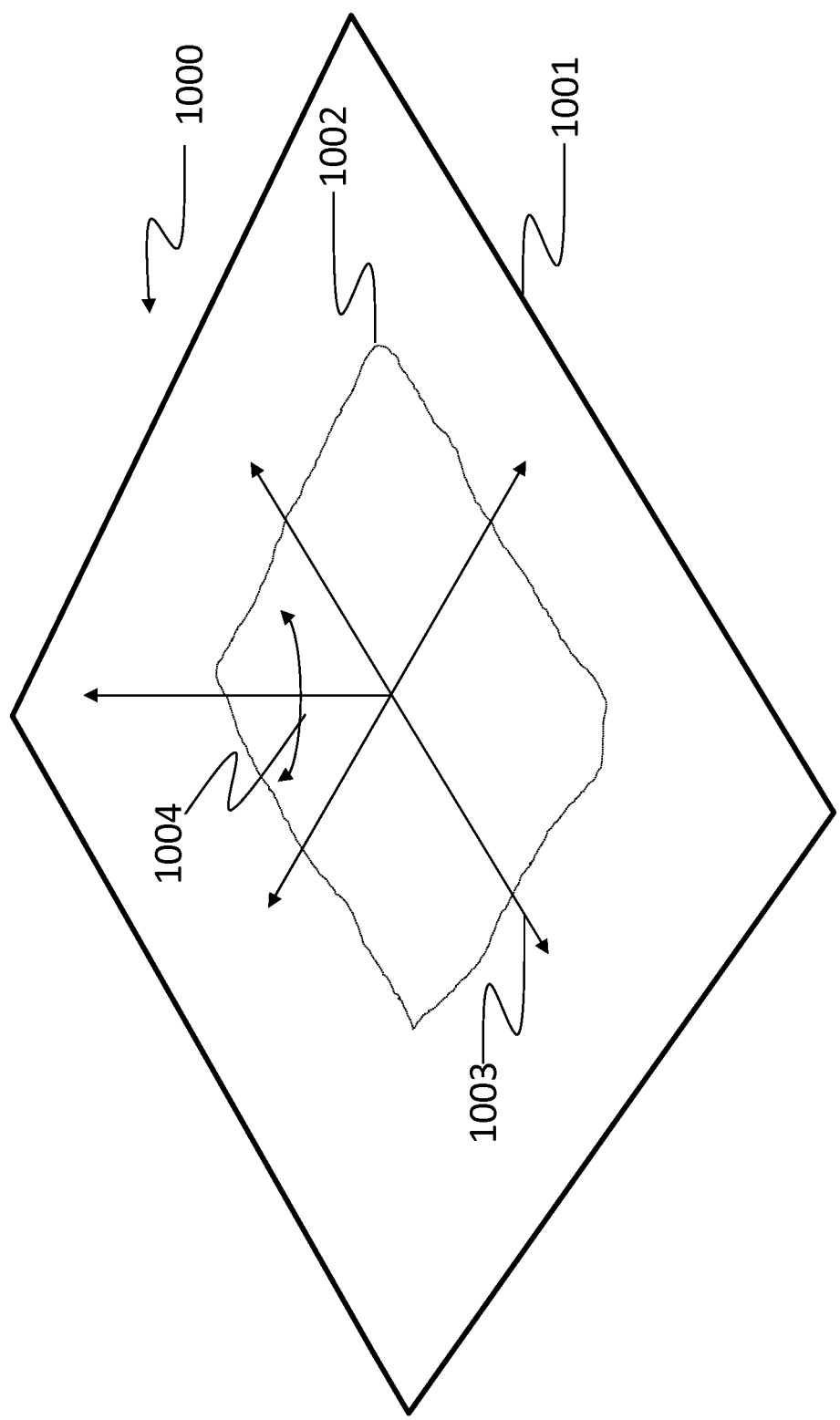
FIG. 10 illustrates an alternate embodiment for the visual feedback for a planar surface.

It is clear that other variations and types of visual feedback can be displayed. For example, an alternate visual feedback for a planar surface 1000 is shown in FIG. 10. Arrows 1003 are displayed as simple lines and the rotation axis 1004 oriented along the normal vector of the plane is displayed. The modeled surface 1001 as well as the current frame 1002 are depicted.

Figure 11:
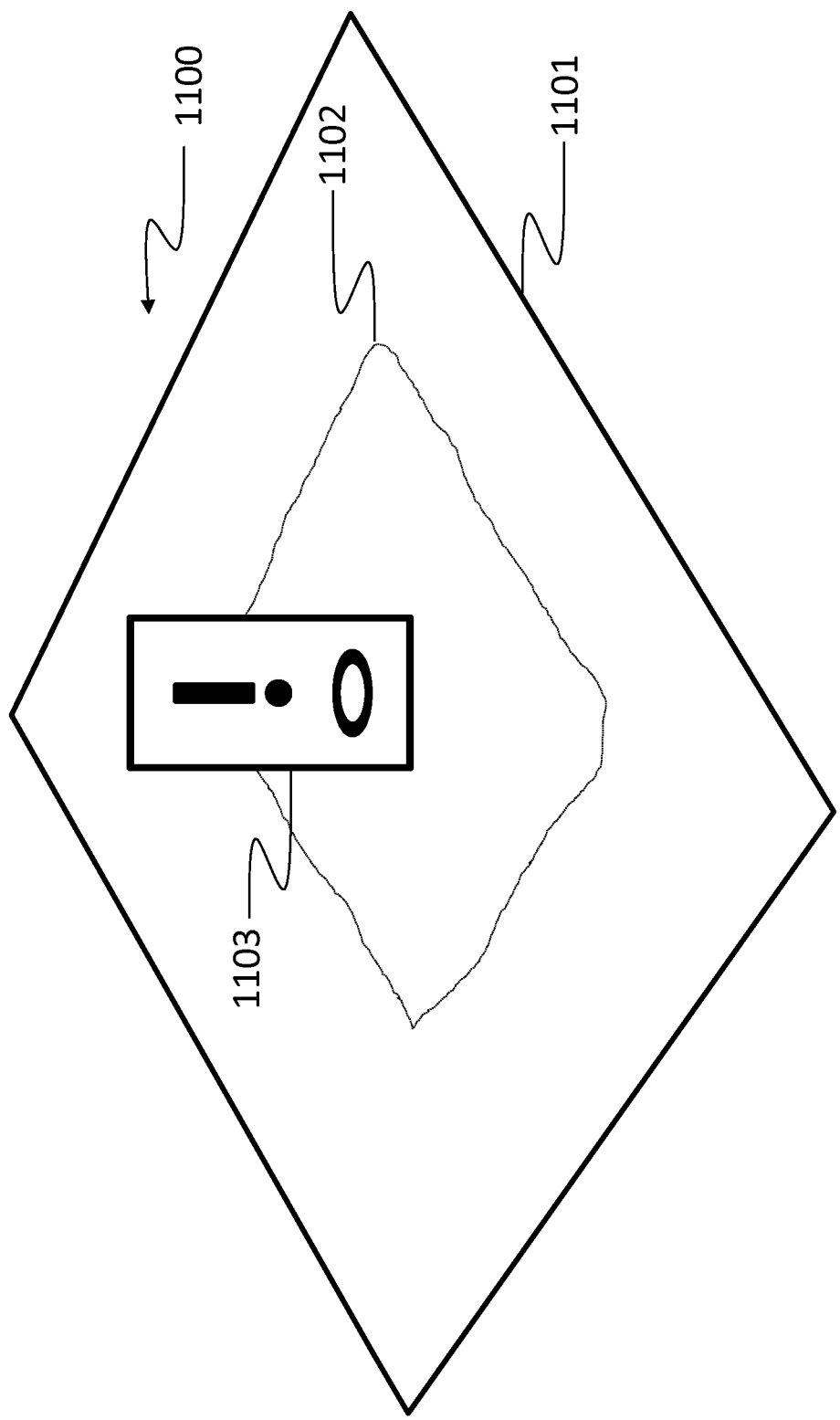
FIG. 11 illustrates an alternate embodiment for the visual feedback suggesting the addition of targets.

In FIG. 11, another example of a visual feedback 1100 is presented. An icon 1103 is displayed, suggesting the addition of at least one target on the surface where the current frame 1102 is captured. Here, the surface model 1101 is also represented. In this specific case of a planar surface, more than one target should be added to fully constrain the degrees of freedom.

Figure 12:
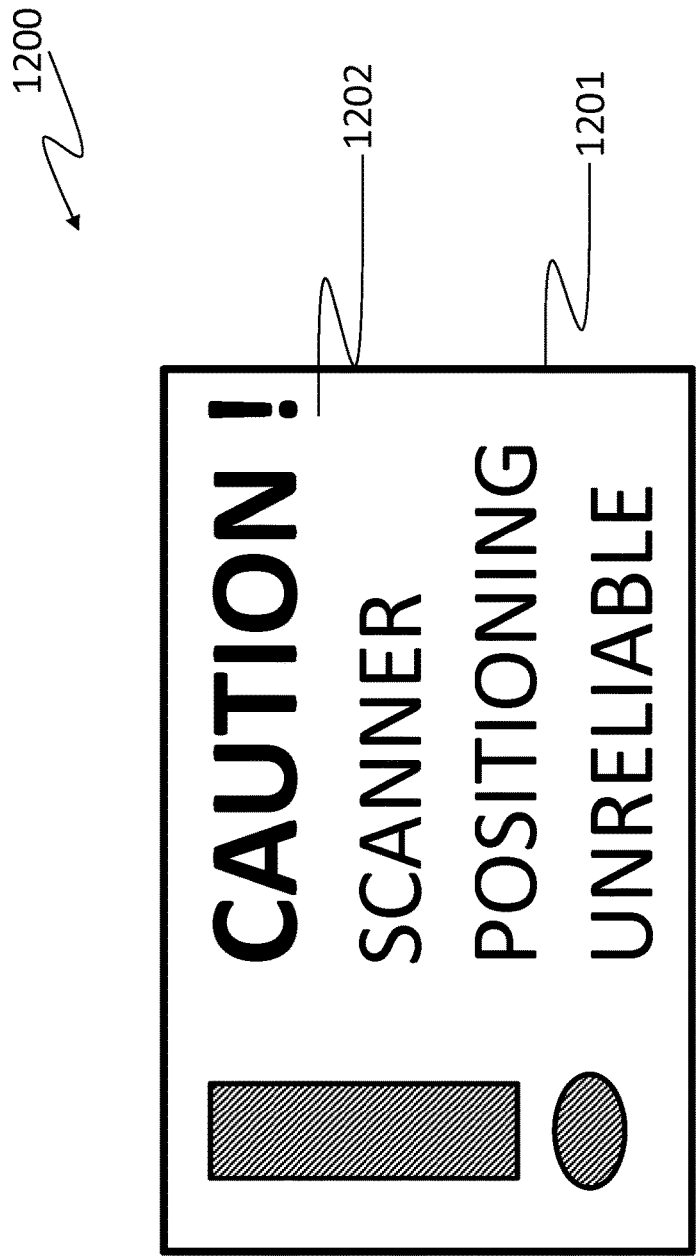
FIG. 12 illustrates an alternate embodiment for the visual feedback using a text message.

FIG. 12 presents yet another example visual feedback 1200. Visual feedback 1200 is a text message 1201 which contains a warning message 1202 directed at the user. In this example, the text message 1201 is the following: "Caution! Scanner positioning unreliable". In this example, there is no indication for the user as to the nature of the slippage. The user is simply warned that the scanner positioning is currently unreliable. The user may then decide to activate another type of feedback on the user interface and/or to simply add targets in the scene.

Visual Feedback

The steps for displaying a visual feedback superimposed on a display of the current frame, and optionally, the partially modeled object are detailed hereinafter.

We first consider the case of the translation, shown in FIG. 5. The goal is to superimpose the longitudinal arrow on the display of the current frame. The arrow is oriented along a direction where the positioning is less reliable. The average (center of gravity) of the 3D points of the current frame is calculated. Then the closest 3D point to the center of gravity is identified before a constant arbitrary offset is added in the direction of the optical axis of the view displayed. That will create the illusion of the arrow being between the viewer and the surface. The arrow is thus drawn at this position and it is oriented in the direction of the translation vector component of the identified eigenvector. When the arrow is drawn with a width such as in FIG. 5, its roll can be calculated after calculating the average normal vector of the 3D points in the current frame before applying a cross-product with the calculated direction of the arrow.

For the case of a single rotation, shown in FIG. 7, after having identified the direction of the axis of rotation from the eigenvector, one calculates the position of the axis. For that purpose, one considers the direction of the axis as the normal vector of an arbitrary plane and the 3D points are projected in that plane. The normal associated with each 3D point is also projected in the same plane to get a 2D vector. Each projected point along with its projected normal defines a line in the projection plane. The sought-after axis will intersect this plane at the point that minimizes the sum of squared distances to the whole set of lines. A weight is also applied to each of these distances. The weight is set proportional to the length of the projected normal vector associated with each point. More formally, we search X such that:

$$\operatorname*{argmin}_{X} w_i \left( \frac{a_i X + c_i}{\|a_i\|} \right)^2, \quad (7)$$

Where X is the 2D point that is sought in the plane, $a_i$, $c_i$ are the parameters of a straight line and $w_i$ is the weight associated with each point. From the found point X and the direction of the rotation axis, the axis is set in 3D. The curved arrow is positioned such that its center is the calculated rotation axis. In this example, the radius of curvature is fixed but it is clear that it can be adjusted based on a function of the 3D points such as inertia around the rotation axis. Along the axis, the arrow is positioned at the projection of the center of gravity of the points on the axis. Finally, in order to avoid oscillations around the axis from one frame to the other, due to noise for example, the vector corresponding to the y axis of the sensor is projected in the plane where the arrow will be drawn. The same is accomplished for the intrinsic y axis of the curved arrow before aligning this latter projected y axis with the projected y axis of the sensor. This way, the clocking of the curved arrow will depend on the sensor viewpoint relative to the observed surface.

For the case of the cylinder shown in FIG. 3, the procedure applied for the surface of revolution is applied to determine the rotation axis. Then the curvature of the cylinder is estimated. This makes it possible to curve the displayed cross arrow. To do so, the curvature radius is estimated from the whole set of 3D points. The radius is made equal to the average distance between the points and the cylinder axis. Finally, it is determined whether the cylinder's visible surface appears convex or concave relative to the sensor viewpoint. To do so, the center of gravity of the 3D points is calculated and its closest 3D point is identified. The cylinder is said to appear convex when the identified closest 3D point is closer to the sensor than the calculated center of gravity. Otherwise, it is said to appear concave. The concavity is only an indication. It is possible for concentric sections of cylinders sharing the same axis to be observed and these cylinders may not be all concave with respect to the sensor viewpoint. Nevertheless, the calculated radius of curvature will be decreased or increased slightly depending on whether it is convex or concave, respectively. It can be increased or decreased by a factor of 20%. This ensures that the overlaid cross arrow will be completely visible after display.

For the case of a planar section shown in FIG. 4, the cross arrow is also used. The position of the cross is calculated following the same procedure described for the linear extrusion. The two directions are orthogonal. In order to avoid potential oscillations, due to noise for example, around the axis that is normal to the plane, the same procedure that stabilizes the orientation for the case of a single rotation for the surface of revolution is applied. The normal vector of the cross can be calculated as the average normal associated with the 3D points. It can also be obtained as the rotation component ($r_i$) of the eigenvector whose norm of the associated rotation component is maximum.

After the case of a spherical section has been identified, a sphere is fitted on the set of 3D points following a standard least squares method. From this procedure, the center and the radius are obtained. In the same way it is performed for the case of a cylinder, the curvature is labeled as concave or convex with respect to the sensor viewpoint and the radius is increased or decreased for display purposes. The curved cross arrow is positioned at the closest 3D point with respect to the center of gravity. It is firstly oriented in a plane whose normal vector is determined based on the average normal associated with the 3D points. Then within this plane, the orientation of the cross is stabilized using the same procedure that is used for the single rotation. For the same reason, this prevents oscillations that are due to noise between frames.

While scanning an object, the visual indications just described can be activated. When less reliable degrees of freedom are identified, the arrows can be displayed to activate a positioning alarm. The arrows can be colored, for example using red. The user can add targets to the object or its environment and carry on with scanning the object. If the less reliable degrees of freedom are eliminated, the display of the visual indications is stopped. Otherwise, similar or different visual indications can be displayed.

In one embodiment, the system does not add the newly observed frame of 3D points to an accumulated model of the object surface until the positioning reliability is ensured. This prevents the contamination of the model with ill-positioned frames.

In one embodiment, a less severe threshold to identify the less reliable degrees of freedom can be used to display a warning to the user. The warning can be displayed using the same arrows but in a different color such as yellow for example. This will draw the user's attention to a potential positioning reliability issue that could be solved before the effect on the accumulated model is too damaging.

Due to noise and viewpoint issues, variations in the covariance matrix values are possible and this may cause flickering of the visual feedback when the eigenvalue ratio is near the threshold. To prevent such flickering, one can apply temporal filtering. One way to do that consists in counting the number of alarms for the n latest frames and determining when more frames than a predetermined threshold are problematic, including the current frame, before activating the visual feedback alarm. For example, the threshold may be n/2 frames in the n latest frames. A typical value for n is 20 when the frame rate approaches 15 Hz. The number of considered frames slightly exceeds the number of frames that are captured within a second.

Diagnosis Modes

Figure 8:
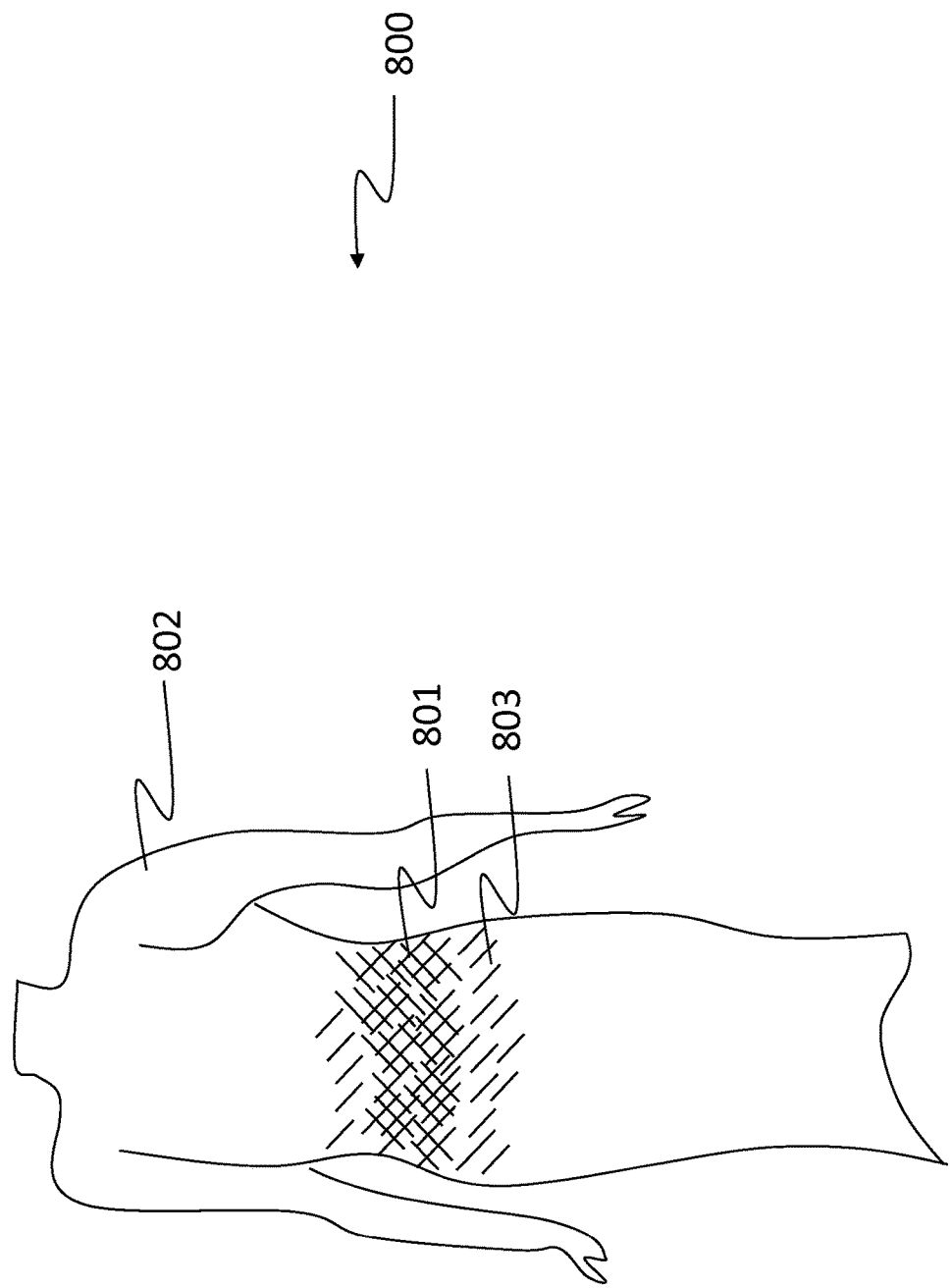
FIG. 8 illustrates a global visual feedback for a scanned object.

The analysis of less reliable degrees of freedom offers very interesting possibilities to help the user scan an object. For instance, in a volumetric surface reconstruction framework, it is possible to accumulate and update the average of the condition number in all voxels that are modified by the 3D captured points:

$$W_{t+1} = \beta W_t + (1-\beta)W_{t-1} \quad (8)$$

Where $W_t$ is the condition number of the covariance matrix at time step t and provides a level of unreliability of the unreliable pose estimation. The parameter β is a constant that controls the memory. It weighs the current value and the previous values. A typical value for β is 0.5. The average of the condition number is a voxel sensitivity level. During scanning in real-time or after scanning, it is possible to display the model with a color corresponding to the average condition number or the voxel sensitivity level. An example of a colored model 800 is shown in FIG. 8. The object 802 is displayed and sections where positioning reliability has been identified as problematic are displayed with one color 801 (a pattern is shown in FIG. 8) whereas sections that are close to being problematic are displayed with another color 803 (another pattern in FIG. 8). In a diagnosis mode such as the one just described, the system would integrate a frame in the model even if it is deemed problematic. This makes it possible to globally visualize the modeled object before the user makes the decision to add targets and rescan the object or some sections of it.

FIG. 14A and FIG. 14B show the potential consequence 1400 of shape based positioning when the calculated position and orientation of the sensor deviate in a region. In FIG. 14A, the reference model 1404 is shown. In FIG. 14B, a distorted model 1402 has been acquired due to surface slippage in region 1401 near 1403.

Figure 13:
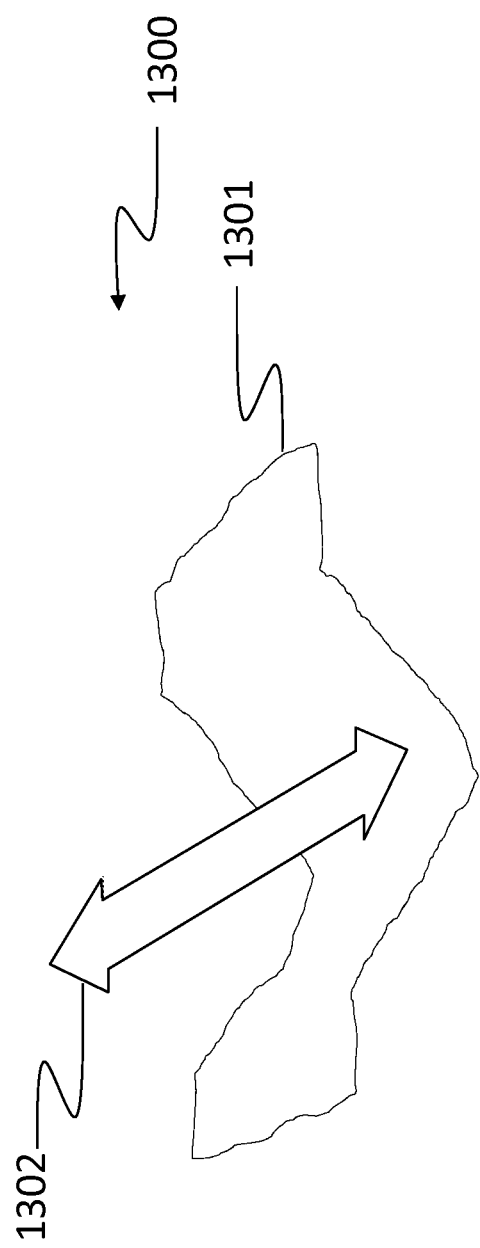
FIG. 13 illustrates visual feedback in diagnosis mode of an unconstrained degree of freedom on a frame of a linearly extruded object section.

In another diagnosis mode, no model is accumulated. The system analyzes the reliability of the pose based solely on the current frame or on a few frames (typically less than 20) without accumulating any model. An example visual feedback 1300 for the diagnosis mode is shown in FIG. 13. The visual feedback 1300 is similar to that shown in FIG. 5 with an arrow 1302 and the current frame 1301 apparent, except that no model is shown here.

EXAMPLE SYSTEM EMBODIMENTS

Figure 15:
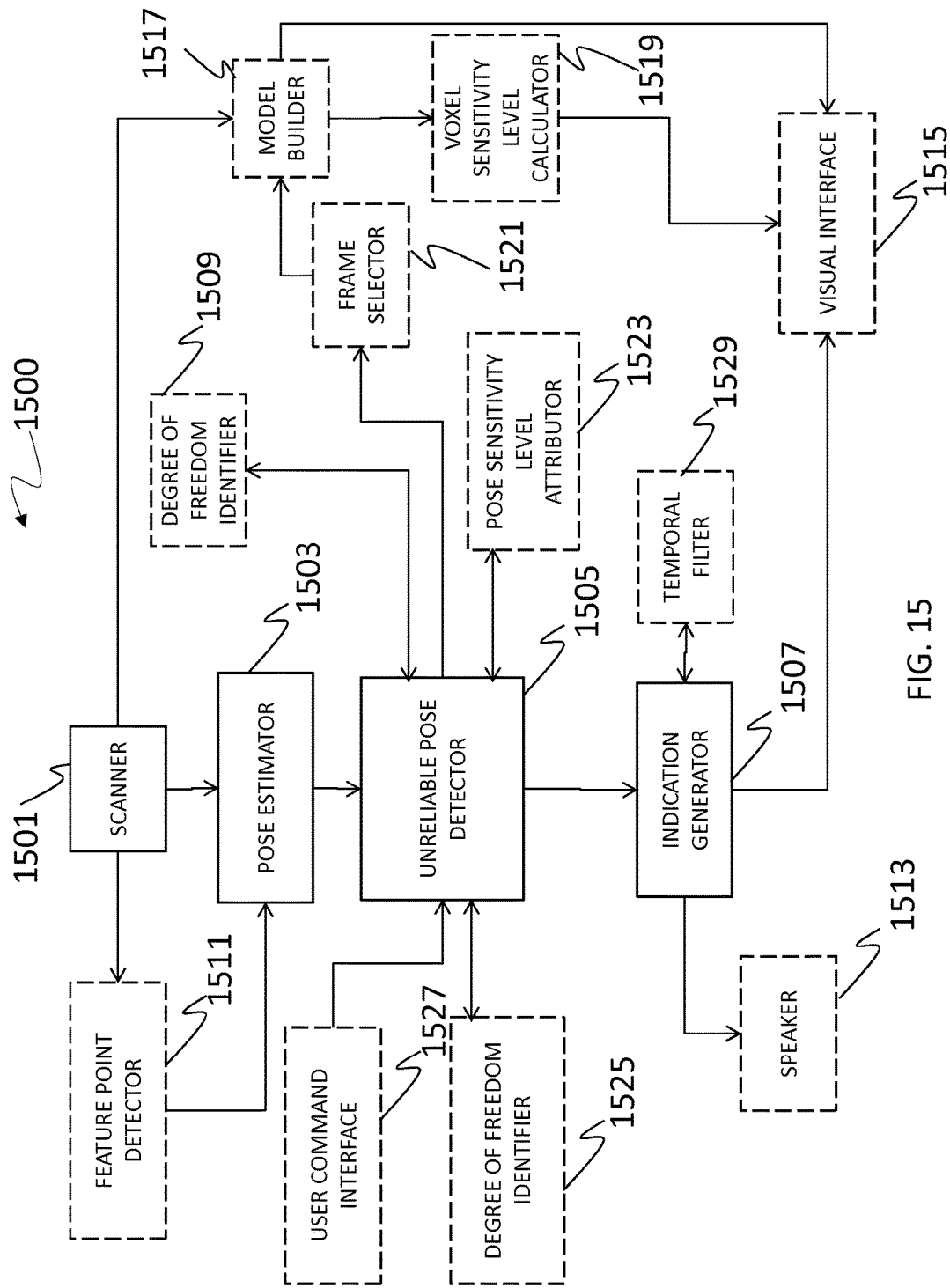
FIG. 15 is a block diagram of example components for the system for providing an indication about positioning unreliability.

FIG. 15 is a block diagram of example components for the system 1500 for providing an indication about positioning unreliability. The system comprises a scanner 1501 for scanning a surface geometry of an object and accumulating a set of 3D points for each frame of a plurality of frames using shape-based positioning for the scanner. It includes a pose estimator 1503 for estimating an estimated pose for the scanner using the 3D points. An unreliable pose detector 1505 determines if the estimated pose has an underconstrained positioning and, if the estimated pose has an underconstrained positioning, identifies the estimated pose as an unreliable pose estimation. An indication generator 1507 generates an indication that the unreliable pose estimation is detected.

In one embodiment, the system 1500 further comprises a degree of freedom identifier 1509 for identifying at least one problematic degree of freedom in the estimated pose, the degree of freedom identifier being triggered by the unreliable pose detector 1505 and wherein the indication generated by the indication generator 1507 includes information about at least one problematic degree of freedom with the indication.

In one embodiment, the indication generated by the indication generator 1507 includes information about all of the problematic degrees of freedom.

In one embodiment, the system 1500 further comprises a feature point detector 1511 for detecting a presence of a feature point reobservable by the scanner 1501 in at least two of the plurality of frames, wherein the pose estimator 1503 uses the feature point with the 3D points to estimate the estimated pose and wherein the unreliable pose detector 1505 uses the feature point to identify the estimated pose as an unreliable pose estimation. The feature point detector 1511 may accumulate a model of feature points to perform the detection of a reobservable feature point in the frames.

In one embodiment, the system 1500 further comprises a speaker 1513, wherein the indication generator 1507 causes the speaker 1513 to emit an audible indication.

In one embodiment, the system 1500 further comprises a visual interface 1515, wherein the indication generator 1507 causes the visual interface 1515 to display a visual indication, wherein the visual indication is at least one of a text message and a graphical message.

In one embodiment, the system 1500 further comprises a model builder 1517, the model builder 1517 building a cumulative model of the geometry of the surface using the sets of 3D points, wherein the visual interface 1515 displays a graphical representation of the cumulative model and wherein the visual indication is superimposed on the graphical representation of the cumulative model.

In one embodiment, the system 1500 further comprises a voxel sensitivity level calculator 1519 for accumulating an average for a voxel sensitivity level in all voxels of the cumulative model modified by the set of 3D points, wherein the visual interface 1515 displays the graphical representation of the cumulative model with a color corresponding to the voxel sensitivity level.

In one embodiment, the system 1500 further comprises a frame selector 1521 for determining a level of unreliability of the unreliable pose estimation; comparing the level of unreliability with a pre-determined unreliability threshold; transferring the set of 3D points of each frame to the model builder 1517 only if the level of unreliability is lower than the pre-determined unreliability threshold. In another embodiment, the frame selector 1521 may transfer all sets of 3D points of all frames to the model builder 1517 with the indication of the level of unreliability. The frame selector 1521 may conduct a comparison with one or many unreliability thresholds to qualify the level of unreliability and prepare the indication of the level of unreliability. In still another embodiment, the scanner 1501 is in communication with the model builder 1517 to transfer the sets of 3D points of all frames. The frame selector 1521 determines the level of unreliability of the unreliable pose estimation and communicates this information to the model builder 1517.

In one embodiment, the visual interface 1515 displays a graphical representation of a current frame of the scanning and wherein the visual indication is superimposed on the graphical representation of the current frame.

In one embodiment, the system 1500 further comprises a pose sensitivity level attributor 1523 for attributing a pose sensitivity level to the estimated pose using the estimated pose, the pose sensitivity level attributor 1523 being triggered by the unreliable pose detector 1505 and wherein the indication generated by the indication generator 1507 includes information about the pose sensitivity level with the indication, wherein the information about the pose sensitivity level is a color of the visual indication.

In one embodiment, the system 1500 further comprises a degree of freedom identifier 1525 for identifying at least one problematic degree of freedom in the estimated pose, the unreliability degree of freedom identifier 1525 being triggered by the unreliable pose detector 1505 and wherein the indication generated by the indication generator 1507 includes information about at least one problematic degree of freedom with the indication, wherein the graphical message includes at least one arrow, the arrow being displayed with an orientation corresponding to the problematic degree of freedom.

In one embodiment, the system 1500 further comprises a user command interface 1527, the user command interface 1527 receiving a command from a user to perform a positioning reliability verification, wherein the unreliable pose detector 1505 and the indication generator 1507 are triggered by the command to generate the indication that the unreliable pose estimation is detected.

In one embodiment, the system 1500 further comprises a temporal filter 1529, the temporal filter 1529 triggering the indication generator 1507 to generate the indication when the number of frames having an unreliable pose estimation in the n latest frames of the plurality of frames reaches a predetermined threshold.

Although the above description relates to example embodiments as presently contemplated by the inventors, it will be understood that the invention in its broad aspect includes equivalents of the elements described herein.

The embodiments described above are intended to be exemplary only. The scope of the invention is therefore intended to be limited solely by the appended claims.

We claim:

1. A system for providing an indication about positioning unreliability, the system comprising:
   a scanner for scanning a surface geometry of an object and accumulating a set of 3D points for each frame of a plurality of frames using shape-based positioning for said scanner;
   a feature point detector for detecting a presence of a feature point reobservable by said scanner in at least two of said plurality of frames, wherein the feature point is used for constraining at least one degree of freedom;
   a pose estimator for estimating, using said set of 3D points and said feature point, an estimated pose for said scanner with respect to said object;
   an unreliable pose detector for:
      determining if said estimated pose has an underconstrained positioning including determining a geometry type by:
         using a covariance matrix built using the set of 3D points and the feature point and which describes a quality of a fit of a frame as a function of a variation of said estimated pose;
         extracting eigenvectors of said covariance matrix;
         calculating a ratio of corresponding eigenvalues of said eigenvectors;
         identifying at least on high ratio of said ratios using a predetermined threshold;
         extracting at least one problematic eigenvector from said high ratio;
         if a high ratio is identified, determining said surface geometry type to correspond to one of a plane and a sphere; and, if said estimated pose has an underconstrained positioning, identifying said estimated pose as an unreliable pose estimation; and
   an indication generator for generating an indication that said unreliable pose estimation is detected.

2. The system as claimed in claim 1, further comprising a degree of freedom identifier for identifying at least one problematic degree of freedom in said estimated pose, said degree of freedom identifier being triggered by said unreliable pose detector and wherein said indication generated by said indication generator includes information about at least one problematic degree of freedom with said indication.

3. The system as claimed in claim 2, wherein said indication generated by said indication generator includes information about all some of said at least one problematic degree of freedom.

4. The system as claimed in claim 1, further comprising a speaker, wherein said indication generator causes said speaker to emit an audible indication.

5. The system as claimed in claim 1, further comprising a visual interface, wherein said indication generator causes said visual interface to display a visual indication, wherein said visual indication is at least one of a text message and a graphical message.

6. The system as claimed in claim 5, further comprising a model builder, said model builder building a cumulative model of said geometry of said surface using said sets of 3D points, wherein said visual interface displays a graphical representation of said cumulative model and wherein said visual indication is superimposed on said graphical representation of said cumulative model.

7. The system as claimed in claim 5, further comprising a voxel sensitivity level calculator for accumulating an average for a voxel sensitivity level in all voxels of said cumulative model modified by said set of 3D points, wherein said visual interface displays said graphical representation of said cumulative model with a color corresponding to said voxel sensitivity level.

8. The system as claimed in claim 5, further comprising a frame selector for determining a level of unreliability of said unreliable pose estimation; comparing said level of unreliability with a pre-determined unreliability threshold; transferring said set of 3D points of each said frame to said model builder only if said level of unreliability is lower than said pre-determined unreliability threshold.

9. The system as claimed in claim 5, wherein said visual interface displays a graphical representation of a current frame of said scanning and wherein said visual indication is superimposed on said graphical representation of said current frame.

10. The system as claimed in claim 5, further comprising a pose sensitivity level attributor for attributing a pose sensitivity level to said estimated pose using said estimated pose, said pose sensitivity level attributor being triggered by said unreliable pose detector and wherein said indication generated by said indication generator includes information about said pose sensitivity level with said indication, wherein said information about said pose sensitivity level is a color of said visual indication.

11. The system as claimed in claim 5, further comprising a degree of freedom identifier for identifying at least one problematic degree of freedom in said estimated pose, said unreliability degree of freedom identifier being triggered by said unreliable pose detector and wherein said indication generated by said indication generator includes information about at least one of said at least one problematic degree of freedom with said indication;
   wherein said graphical message includes at least one arrow, said at least one arrow being displayed with an orientation corresponding to said at least one of said problematic degree of freedom.

12. The system as claimed in claim 1, further comprising a user command interface, said user command interface receiving a command from a user to perform a positioning reliability verification, wherein said unreliable pose detector and said indication generator are triggered by said command to generate said indication that said unreliable pose estimation is detected.

13. The system as claimed in claim 1, further comprising a temporal filter, said temporal filter triggering said indication generator to generate said indication when a number u of frames having an unreliable pose estimation in the n latest frames of said plurality of frames reaches a predetermined threshold.

14. A method for providing an indication about positioning unreliability, the method comprising:
   scanning a surface geometry of an object and accumulating a set of 3D points for each frame of a plurality of frames using shape-based positioning;
   estimating, using said set of 3D points, an estimated pose for said scanner with respect to said object;
   determining if said estimated pose has an underconstrained positioning by:
      using a covariance matrix which describes a quality of a fit of a frame as a function of a variation of said estimated pose;
      extracting eigenvectors of said covariance matrix;

calculating a ratio of corresponding eigenvalues of said eigenvectors;
identifying at least one high ratio of said ratios using a predetermined threshold;
extracting at least one problematic eigenvector from said high ratio;
if there is a single high ratio, determining said surface geometry type to correspond to one of a linear extrusion, a surface of revolution and a helix;
if there are two high ratios, confirming said surface geometry type to correspond to a cylinder;
if there are three high ratios, determining said surface geometry type to correspond to one of plane and a sphere, and, if said estimated pose has an underconstrained positioning, identifying said estimated pose as an unreliable pose estimation;
generating an indication that said unreliable pose estimation is detected;
building a cumulative model of said geometry of said surface using said set of 3D points; and
displaying a graphical representation of said cumulative model and superimposing said visual indication on said graphical representation of said cumulative model at a location on the graphical representation of said cumulative model where said estimated nose is underconstrained.

15. A system for providing an indication about positioning unreliability, the system comprising:
a scanner for scanning a surface geometry of an object and accumulating a set of 3D points for each frame of a plurality of frames using shape-based positioning for said scanner;
a pose estimator for estimating, using said set of 3D points, an estimated pose for said scanner with respect to said object;
an unreliable pose detector for:
determining if said estimated pose has an underconstrained positioning by:
using a covariance matrix which describes a quality of a fit of a frame as a function of a variation of said estimated pose;
extracting eigenvectors of said covariance matrix;
calculating a ratio of corresponding eigenvalues of said eigenvectors;
identifying at least one high ratio of said ratios using a predetermined threshold;
extracting at least one problematic eigenvector from said high ratio;
if there is a single high ratio, determining said surface geometry type to correspond to one of a linear extrusion, a surface of revolution and a helix;
if there are two high ratios, confirming said surface geometry type to correspond to a cylinder; and
if there are three high ratios, determining said surface geometry type to correspond to one of a plane and a sphere, and, if said estimated pose has an underconstrained positioning, identifying said estimated pose as an unreliable pose estimation;
an indication generator for generating an indication that said unreliable pose estimation is detected;
a visual interface, wherein said indication generator causes said visual interface to display a visual indication, wherein said visual indication is at least one of a text message and a graphical message; and
a model builder, said model builder building a cumulative model of said geometry of said surface using said sets of 3D points, wherein said visual interface displays a graphical representation of said cumulative model and wherein said visual indication is superimposed on said graphical representation of said cumulative model at a location on the graphical representation of said cumulative model where said estimated pose is underconstrained.

16. The system as claimed in claim 15, further comprising a speaker, wherein said indication generator causes said speaker to emit an audible indication.

17. The system as claimed in claim 15, further comprising a voxel sensitivity level calculator for accumulating an average for a voxel sensitivity level in all voxels of said cumulative model modified by said set of 3D points, wherein said visual interface displays said graphical representation of said cumulative model with a color corresponding to said voxel sensitivity level.

18. The system as claimed in claim 15, further comprising a frame selector for determining a level of unreliability of said unreliable pose estimation; comparing said level of unreliability with a pre-determined unreliability threshold; transferring said set of 3D points of each said frame to said model builder only if said level of unreliability is lower than said pre-determined unreliability threshold.

19. The system as claimed in claim 15, further comprising a pose sensitivity level attributor for attributing a pose sensitivity level to said estimated pose using said estimated pose, said pose sensitivity level attributor being triggered by said unreliable pose detector and wherein said indication generated by said indication generator includes information about said pose sensitivity level with said indication, wherein said information about said pose sensitivity level is a color of said visual indication.

20. The system as claimed in claim 15, further comprising a degree of freedom identifier for identifying at least one problematic degree of freedom in said estimated pose, said unreliability degree of freedom identifier being triggered by said unreliable pose detector and wherein said indication generated by said indication generator includes information about at least one of said at least one problematic degree of freedom with said indication;
wherein said graphical message includes at least one arrow, said at least one arrow being displayed with an orientation corresponding to said at least one of said problematic degree of freedom.

21. The system as claimed in claim 15, further comprising a user command interface, said user command interface receiving a command from a user to perform a positioning reliability verification, wherein said unreliable pose detector and said indication generator are triggered by said command to generate said indication that said unreliable pose estimation is detected.

22. The system as claimed in claim 15, further comprising a temporal filter, said temporal filter triggering said indication generator to generate said indication when a number u of frames having an unreliable pose estimation in the n latest frames of said plurality of frames reaches a predetermined threshold.

23. The system as claimed in claim 20, wherein the at least one arrow is curved to match the graphical representation of said cumulative model.

24. A method for providing an indication about positioning unreliability, the method comprising:
scanning a surface geometry of an object and accumulating a set of 3D points for each frame of a plurality of frames using shape-based positioning;

detecting a presence of a feature point reobservable by said scanner in at least two of said plurality of frames, wherein the feature point is used for constraining at least one degree of freedom;

estimating, using said set of 3D points and said feature point, an estimated pose for said scanner with respect to said object;

determining if said estimated pose has an underconstrained positioning including determining a geometry type by:

using a covariance matrix which describes a quality of a fit of a frame as a function of a variation of said estimated pose;

extracting eigenvectors of said covariance matrix;

calculating a ratio of corresponding eigenvalues of said eigenvectors;

identifying at least one high ratio of said ratios using a predetermined threshold;

extracting at least one problematic eigenvector from said high ratio;

if a high ratio is identified, determining said surface geometry type to correspond to one of a plane and a sphere; and if said estimated pose has an underconstrained positioning, identifying said estimated pose as an unreliable pose estimation; and generating an indication that said unreliable pose estimation is detected.

* * * * *